(12) United States Patent
Ishikawa et al.

(10) Patent No.: US 7,774,592 B2
(45) Date of Patent: Aug. 10, 2010

(54) ENCRYPTED COMMUNICATION METHOD

(75) Inventors: Yuichi Ishikawa, Tokyo (JP); Norihito Fujita, Tokyo (JP); Akio Iijima, Tokyo (JP); Atsushi Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 1063 days.

(21) Appl. No.: 10/585,850

(22) PCT Filed: Dec. 28, 2004

(86) PCT No.: PCT/JP2004/019593

§ 371 (c)(1),
(2), (4) Date: Jul. 12, 2006

(87) PCT Pub. No.: WO2005/069532

PCT Pub. Date: Jul. 28, 2005

(65) Prior Publication Data

US 2008/0235507 A1 Sep. 25, 2008

(30) Foreign Application Priority Data

Jan. 14, 2004 (JP) .............................. 2004-006542

(51) Int. Cl.
*H04L 29/06* (2006.01)
*G06F 7/04* (2006.01)
*G06F 15/16* (2006.01)
*G06F 17/30* (2006.01)
*G06F 15/173* (2006.01)

(52) U.S. Cl. ................ 713/150; 726/3; 726/5; 709/224; 709/245

(58) Field of Classification Search ................ 713/150; 726/3, 5; 709/224, 245
See application file for complete search history.

(56) References Cited

U.S. PATENT DOCUMENTS 6,961,783 B1 * 11/2005 Cook et al. ................ 709/245

(Continued)

FOREIGN PATENT DOCUMENTS

JP           2000-99429 A      4/2000

(Continued)

OTHER PUBLICATIONS

Yuichi Ishikawa et al. "User-Customized Network Services Provided by Multi-Layer DNS", Technical Report of IEICE, CS2003-81-98, vol. 103, No. 314, The Institute of Electronics, Information and Communication Engineers, Sep. 12, 2003, pp. 91-94.

*Primary Examiner*—Shin-Hon Chen
(74) *Attorney, Agent, or Firm*—Sughrue Mion, PLLC

(57) ABSTRACT

A DNS Proxy unit (A12a) holds the domain name of an encrypted communication target node in a CUG setting table (A125a), intercepts a name resolution request for a communication partner node output from an application (A11x) to a DNS server (B1a), determines by looking up the CUG setting table (A125a) whether the communication partner is an encrypted communication target node, and if the communication partner is an encrypted communication target node, registers the IP address of the name-resolved communication partner in an encrypted communication path setting table (A142a). A data packet sent from the application (A11x) to the IP address is intercepted by a data transmission/reception unit (A14a). A data packet to an IP address registered in the encrypted communication path setting table (A142a) is encrypted by a communication encryption unit (A141a) and transmitted to the communication partner. In this way, in executing encrypted communication with a plurality of communication partners by using a communication encryption function provided by an OS, setting of the encrypted communication target node can be done by using a domain name.

44 Claims, 8 Drawing Sheets

U.S. PATENT DOCUMENTS

| | | | |
|---|---|---|---|
| 2007/0118884 A1* | 5/2007 | Ozaki et al. | 726/5 |
| 2008/0016552 A1* | 1/2008 | Hart | 726/3 |
| 2009/0216875 A1* | 8/2009 | Shi | 709/224 |

FOREIGN PATENT DOCUMENTS

| | | |
|---|---|---|
| JP | 2000-183951 A | 6/2000 |
| JP | 2001-320403 A | 11/2001 |

* cited by examiner

| CUG IDENTIFICATION INFORMATION | ENCRYPTED COMMUNICATION PATH SETTING INFORMATION | | |
|---|---|---|---|
| DOMAIN NAME | COMMUNICATION PROTOCOL | DIGITAL CERTIFICATE ID | ENCRYPTION ALGORITHM |
| ... | ... | ... | ... |
| taro.nec.co.jp | SSL | 10 | 3DES |
| jiro.biglobe.ne.jp | IPSec | 15 | AES |
| *.myfriends.com | SSL | 11 | DES |
| *.myfamily.com | IPSec | 12 | 3DES |
| sato.* | SSL | 13 | DES |
| *.satofamily.* | SSL | 14 | AES |
| ... | ... | ... | ... |

| COMMUNICATION PARTNER IP ADDRESS | ENCRYPTED COMMUNICATION PATH SETTING INFORMATION | | |
|---|---|---|---|
| | COMMUNICATION PROTOCOL | DIGITAL CERTIFICATE ID | ENCRYPTION ALGORITHM |
| ... | ... | ... | ... |
| 133.11.64.24 | IPSec | 10 | 3DES |
| 19.23.43.13 | IPSec | 15 | AES |
| 1.3.3.2 | IPSec | 11 | DES |
| ... | ... | ... | ... |

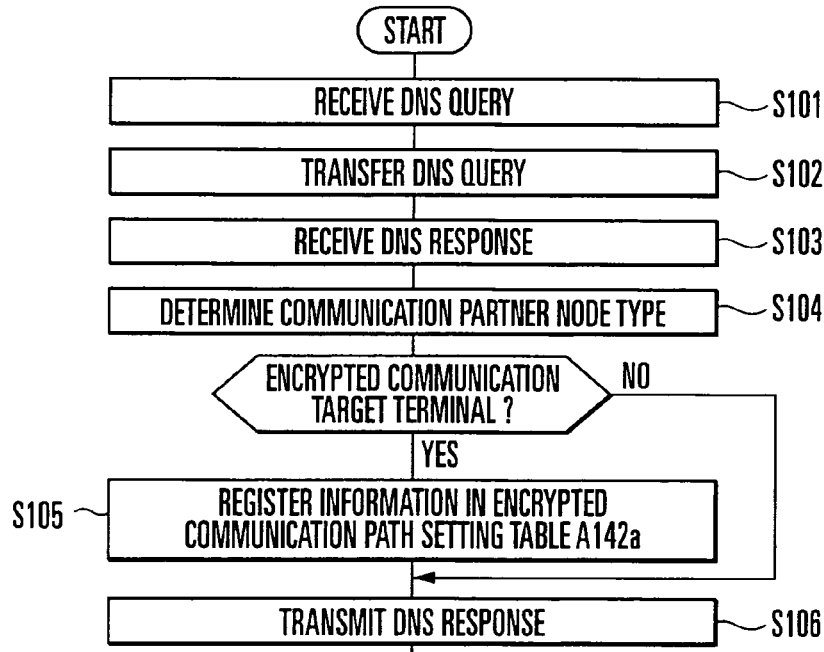

FIG. 4

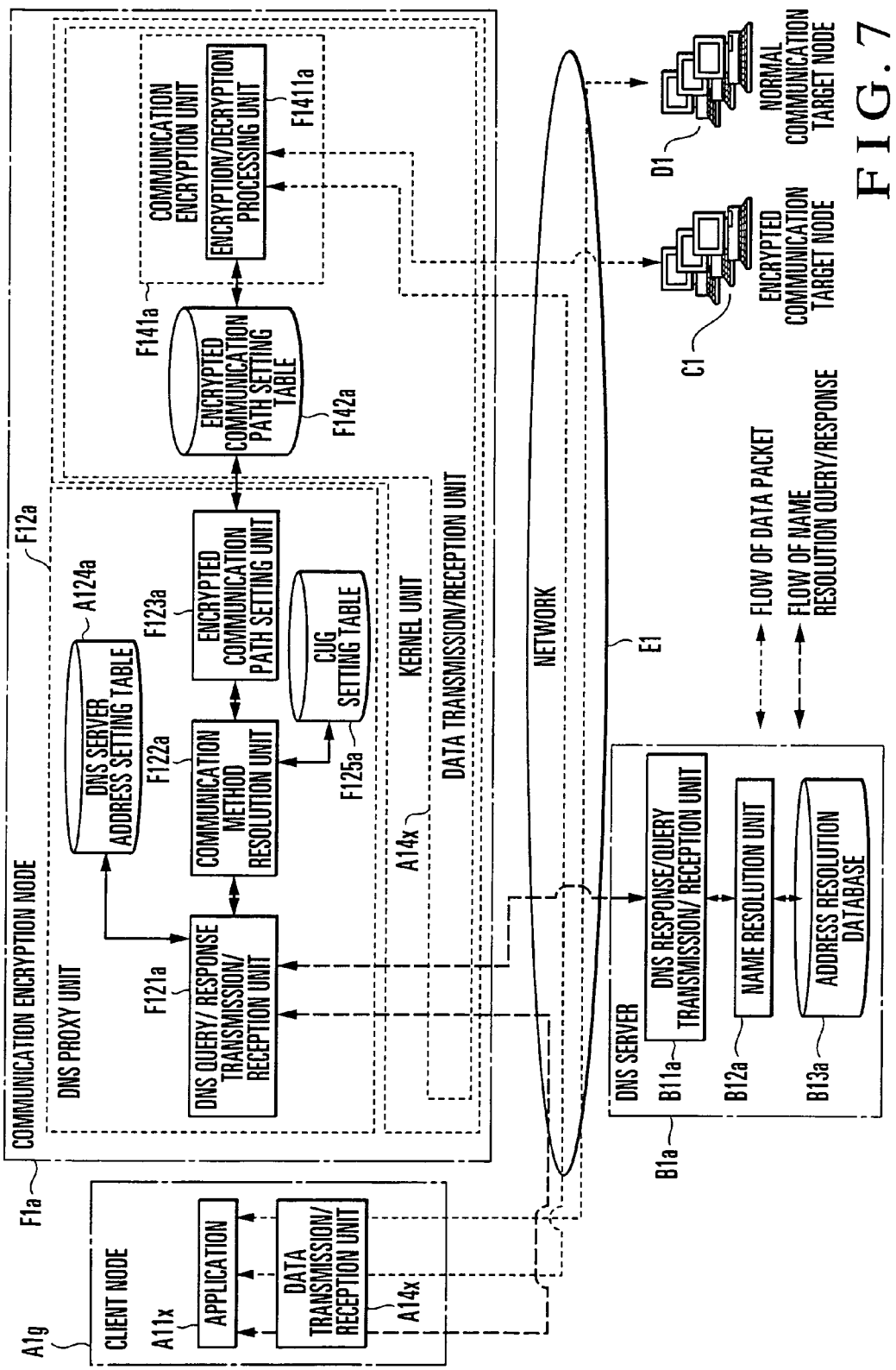
F I G. 7

| INTERCEPT ADDRESS | COMMUNICATION PARTNER IP ADDRESS | ENCRYPTED COMMUNICATION PATH SETTING INFORMATION ||| 
| | | COMMUNICATION PROTOCOL | DIGITAL CERTIFICATE ID | ENCRYPTION ALGORITHM |
|---|---|---|---|---|
| ... | ... | ... | ... | ... |
| fe80::3090 | aa91::1001 | SSL | 10 | 3DES |
| fe81::3091 | bb92::1002 | IPSec | 15 | AES |
| ... | ... | ... | ... | ... |

ENCRYPTED COMMUNICATION METHOD

This application claims priority from PCT Application No. PCT/JP2004/019593 filed Dec. 28, 2004, and from Japanese Patent Application No. 2004-006542 filed Jan. 14, 2004, which applications are incorporated herein by reference.

TECHNICAL FIELD

The present invention relates to an encrypted communication method and encrypted communication system which execute, on an open network to which many and unspecified nodes are connected, secure communication between a plurality of nodes belonging to a specific group, a node apparatus, and an encrypted communication program.

BACKGROUND ART

Conventionally, on an open network (e.g., Internet or public hot spot) to which many and unspecified nodes are connected, various encrypted communication methods are used to encrypt communication between nodes such as nodes, servers, and gateway apparatuses and provide a secure communication path to prevent any third party from peeping the communication contents, as described in, e.g., RFC2401 or RFC3546.

Encrypted communication protocols to implement an encrypted communication method of this type are roughly classified in the following way depending on the layer to be encrypted.

○ Layer 4 (transport layer) and upper layers

SSL (Secure Socket Layer), TLS (Transport Layer Security), SSH (Secure Shell)

○ Layer 3 (network layer) and lower layers

IPsec, L2TP (Layer 2 Tunneling Protocol) over IPsec, Ethernet® over IPsec

In encrypted communication with another node by using these encrypted communication protocols, the conventional encrypted communication methods can be classified into the following three types depending on the forms of communication encryption.

(1) A form to encrypt communication in individual applications such as an Web browser and e-mail application (2) A form to encrypt communication by using a communication encryption module (3) A form to encrypt communication by using a function provided by the kernel unit of an OS (Operating System)

The encrypted communication method of form (1) uses the above-described communication encryption protocol for layer 4 and upper layers. For example, to encrypt HTTP (Hyper Text Transfer Protocol) communication with a communication partner having a domain name "example.com", a URL (Universal Resource Locator) such as "https://example.com/index.html" is input in a Web browser to encrypt the HTTP communication with the communication partner by SSL. Such a communication encryption form cannot be used unless the application supports the communication encryption protocol, as a matter of course.

In communication encryption of form (2) using a communication encryption module, the above-described communication encryption protocol for layer 4 and upper layers is mainly used. The communication encryption module operates as an independent process. The communication encryption module intercepts data packets transmitted/received between an application and a communication partner, encrypts/decrypts the packets, and transmits them to the communication partner/application. Examples of the communication encryption module are stunnel that SSL-encrypts an arbitrary TCP (Transport Control Protocol) connection and SSH port forwarding to encryption-tunnel an arbitrary TCP connection by SSH.

The communication encryption method of form (2) can encrypt communication of an arbitrary application because the method can encrypt communication independently of whether an application supports the communication encryption protocol, like the communication encryption method of form (3). This communication encryption form can encrypt communication with consciousness of an application, unlike the communication encryption method of form (3). Hence, only communication of a specific application can be done.

FIG. 10 shows the outline of communication encryption processing by the communication encryption method of form (2). A communication encryption module A13$x$ includes a communication encryption unit A131$x$ to execute communication encryption processing, and an encrypted communication path setting table A132$x$ in which only a set of the address of a target node (to be referred to as an encrypted communication target node) C1 of encrypted communication and encrypted communication path setting information is registered. The communication encryption module A13$x$ operates as an independent process by itself. To cause the communication encryption module A13$x$ to execute communication encryption processing of a data packet transmitted from an application A11$x$, the application A11$x$ temporarily transfers the data packet to the communication encryption module A13$x$ to execute necessary encryption processing. After that, the communication encryption module A13$x$ transmits the data packet to the actual communication partner. Hence, the application A11$x$ transmits the data packet by designating the loopback address, i.e., "127.0.0.1" (and the reception port number of the process (communication encryption module)) as needed) as the destination address, instead of directly designating the IP address of the actual communication partner, such that the communication encryption module A13$x$ can receive the data packet. Upon receiving the data packet from the application A11$x$, the communication encryption module A13$x$ causes an encryption/decryption processing unit A1311$x$ of the communication encryption unit A131$x$ to encrypt the data packet (by using protocol: SSL, encryption algorithm: DES, and digital certificate ID: 11 in FIG. 10) in accordance with encrypted communication path setting information for the preset communication partner (node of IP address "1.2.3.4" in FIG. 10) by looking up the encrypted communication path setting table A132$x$. Then, the communication encryption module A13$x$ causes an address conversion unit A1312$x$ to rewrite the destination to IP address "1.2.3.4" and transmits the data packet.

The encrypted communication method of form (2) may employ the arrangement with a client node A1$x$ incorporating the communication encryption module A13$x$, as shown in FIG. 10, or an arrangement in which the communication encryption module is provided as a communication encryption proxy node by an external node. In this case, the application transmits a data packet by designating the IP address of the external node to the destination address. The communication encryption module executes necessary encryption processing for the received data packet and transmits it to a preset communication partner (the IP address of the encrypted communication target node is designated).

In the encrypted communication method of form (3) which executes communication encryption by using a function provided by the kernel unit of an OS, the above-described communication encryption protocol for layer 3 and lower layers is mainly used. For example, to encrypt all IP packets to a communication partner having an IP address "1.2.3.4", IPsec setting in a transport mode or tunneling mode is done for the communication partner (IP address=1.2.3.4) in OS setting.

The encrypted communication method of form (3) can encrypt communication of an arbitrary application because the method can encrypt communication independently of whether an application supports the communication encryption protocol, like the encrypted communication method of form (2). However, in the communication encryption form (3), generally, communication with a communication partner having a preset IP address is totally encrypted without consciousness of an application, unlike the encrypted communication method of form (2). Hence, it is therefore impossible to encrypt only communication of a specific application.

FIG. 11 shows the outline of communication encryption processing by the encrypted communication method of form (3). A communication encryption unit A141$y$ to execute communication encryption processing and an encrypted communication path setting table A142$y$ in which the address of an encrypted communication target node and encrypted communication path setting information are registered are included in a data transmission/reception unit A14$y$ in the kernel unit of an OS. All data packets transmitted from the application A11$x$ are transferred to the data transmission/reception unit A14$y$ for transmission processing. The communication encryption unit A141$y$ in the data transmission/reception unit A14$y$ looks up the encrypted communication path setting table A142$y$ on the basis of the destination address of the data packet. When the destination address is registered as an encrypted communication target node (when the destination address is "1.2.3.4" or "5.6.7.8" in FIG. 11), the data packet is encrypted in accordance with the registered encrypted communication path setting information (protocol: IPsec, encryption algorithm: DES, and digital certificate ID: 11 in FIG. 11) and transmitted to the communication partner.

DISCLOSURE OF INVENTION

Problem to be Solved by the Invention

The above-described encrypted communication method using a communication encryption function provided by an OS can implement communication encryption independently of whether the application supports the communication encryption protocol. In addition, unlike the above-described encrypted communication method using a communication encryption module, when a plurality of IP addresses of a partner of encrypted communication (to be referred to as an encrypted communication target node hereinafter) are set in advance, encrypted communication can be done with a plurality of communication partners. However, the cost for setting the encrypted communication target node is high. This problem will be described below in detail.

To execute encrypted communication with a plurality of communication partners on an open network such as the Internet to which many and unspecified nodes are connected, a communication partner serving as an encrypted communication target node must be designated. Identifiers indicating a communication partner on an IP network include a domain name and an IP address (when a partner is designated by a domain name, an IP address corresponding to the domain name must be resolved by a DNS (Domain Name System)). However, because of the following reasons, it is impossible to use these identifiers to designate a communication partner.

○ IP Address

When the number of encrypted communication target nodes is large, the cost of setting is high because it must be done a number of times equal in number to the IP addresses of the communication partner. When an IP address range (also referred to as an IP address scope: e.g., 192.168.1.0/24) is used, settings of a plurality of encrypted communication target nodes can be integrated. In this case, only encrypted communication target nodes belonging to a common IP address range can be set integrally, as a matter of course. For this reason, it is impossible to form a group of arbitrary encrypted communication target nodes independently of the IP addresses and integrate settings for each group. Additionally, since the IP address of a node may be dynamically changed by a mechanism such as DHCP in general, it is impractical to dynamically change the setting in accordance with a change in IP address of the partner node.

○ Domain Name

If designation can be done by using a domain name, setting need not be changed even when the IP address of an encrypted communication target node is dynamically changed by a mechanism such as DHCP. If designation can be done on the basis of a domain name condition (e.g., domain suffix or domain prefix), a group of arbitrary encrypted communication target nodes can be formed independently of the positions on the network, and settings can be integrated for each group.

The communication encryption unit (A141$y$ in FIG. 11) included in the kernel unit of the OS determines the node type of a communication partner on the basis of information contained in a data packet. However, the data packet transmitted from the application generally contains no domain name. For this reason, it is impossible in the prior art to use a domain name to designate the partner of encrypted communication. In some cases, the domain name of the communication partner is contained in the datagram or the header field (e.g., Request header of HTTP) of layer 7 of a data packet. Identifying the communication partner on the basis of these pieces of information is impractical because the communication encryption module requires function expansion specialized to individual applications.

It is an object of the present invention to reduce the setting cost of an encrypted communication target node in executing encrypted communication with a plurality of communication partners by using a communication encryption function provided by an OS.

It is another object of the present invention to prevent the number of setting items and the number of setting procedures from depending on the number of encrypted communication target nodes, IP addresses, and the change frequency of nodes included in a group (i.e., to make the setting cost constant) in setting encrypted communication target nodes.

Means of Solution to the Problem

In order to achieve the above-described objects, according to the present invention, there is provided an encrypted communication method characterized by comprising the steps of:

a) causing a communication method resolution unit to determine on the basis of a domain name contained in one of a name resolution query transmitted from an application that communicates with a node apparatus connected to a network to resolve an IP address of the node apparatus and a name resolution response as a response to the name resolution query whether the node apparatus is an encrypted communication target node;

b) causing an encrypted communication path setting unit to register the IP address of the node apparatus in an encrypted communication path setting table when the node apparatus is the encrypted communication target node;

c) causing a name resolution query/response transmission/reception unit to transmit the IP address of the node apparatus contained in the name resolution response to the application;

d) causing the application to transmit a data packet in which the IP address of the node apparatus is set as a destination address; and e) causing a data transmission/reception unit to receive the data packet transmitted from the application and, if a communication partner IP address set as the destination address of the data packet is registered in the encrypted communication path setting table, encrypt and transmit the data packet.

According to the present invention, there is provided an encrypted communication method characterized by comprising the steps of:

a) causing a communication method resolution unit to determine on the basis of a domain name contained in one of a name resolution query transmitted from an application on a client node to resolve an IP address of another node apparatus serving as a communication target of the application and a name resolution response as a response to the name resolution query whether the other node apparatus is an encrypted communication target node;

b) causing an encrypted communication path setting unit to register, in an encrypted communication path setting table, a correspondence between the IP address of the other node apparatus and an intercept address that is not used in any other communication session when the other node apparatus is the encrypted communication target node;

c) causing a name resolution query/response transmission/reception unit to transmit, to the application as the name resolution response, an intercept address corresponding to the IP address of the other node apparatus contained in the name resolution response;

d) causing the application to transmit a data packet in which the intercept address is set as a destination address; and e) causing a data transmission/reception unit to receive the data packet transmitted from the application, read out, from the encrypted communication path setting table, a communication partner IP address corresponding to the intercept address set as the destination address of the data packet, set the readout communication partner IP address as the destination address of the data packet, and encrypt and transmit the set data packet.

According to the present invention, there is provided a node apparatus characterized by comprising an application that communicates with another node apparatus connected to a network, a data transmission/reception unit provided in a kernel unit, and a name resolution proxy unit which relays a name resolution query transmitted from the application to a name resolution server to resolve an IP address of the other node apparatus and a name resolution response as a response to the name resolution query, the data transmission/reception unit comprising an encrypted communication path setting table which holds a communication partner IP address, and a communication encryption unit which receives a data packet transmitted from the application and encrypts and transmits the data packet when a communication partner IP address set as the destination address of the data packet is registered in the encrypted communication path setting table, and the name resolution proxy unit comprising an encrypted communication path setting unit which registers, in the encrypted communication path setting table, the IP address of the other node apparatus resolved by the name resolution response if it is determined on the basis of a domain name of the other node apparatus contained in one of the name resolution query and the name resolution response that the other node apparatus is an encrypted communication target node.

According to the present invention, there is provided a communication encryption node apparatus connected, through a network, to a client node apparatus in which an application that communicates with another node apparatus connected to the network operates, characterized by comprising:

a data transmission/reception unit provided in a kernel unit, and a name resolution proxy unit which relays a name resolution query transmitted from the application to a name resolution server to resolve an IP address of the other node apparatus and a name resolution response as a response to the name resolution query, the data transmission/reception unit comprising an encrypted communication path setting table which holds a correspondence between a communication partner IP address and an intercept address, and a communication encryption unit which receives a data packet transmitted from the application, reads out, from the encrypted communication path setting table, a communication partner IP address corresponding to an intercept address set as a destination address of the data packet, sets the readout communication partner IP address as the destination address of the data packet, and encrypts and transmits the set data packet, and the name resolution proxy unit comprising an encrypted communication path setting unit which registers, in the encrypted communication path setting table, a correspondence between the IP address of the other node apparatus resolved by the name resolution response and an intercept address that is not used in any other communication session if it is determined on the basis of a domain name of the other node apparatus contained in one of the name resolution query and the name resolution response that the other node apparatus is an encrypted communication target node, and a name resolution query/response transmission/reception unit which transmits, to the application as the name resolution response, the intercept address corresponding to the IP address of the other node apparatus contained in the name resolution response received from the name resolution server.

According to the present invention, there is provided an encrypted communication system characterized by comprising a node apparatus in which an application that communicates with another node apparatus connected to a network operates, and a name resolution server which resolves an IP address of each of the node apparatuses, the node apparatus comprising a data transmission/reception unit provided in a kernel unit, and a name resolution proxy unit which relays a name resolution query transmitted from the application to the name resolution server to resolve the IP address of the other node apparatus and a name resolution response as a response to the name resolution query, the data transmission/reception unit comprising an encrypted communication path setting table which holds a communication partner IP address, and a communication encryption unit which receives a data packet transmitted from the application and encrypts and transmits the data packet when a communication partner IP address set as the destination address of the data packet is registered in the encrypted communication path setting table, the name resolution server comprising a communication method resolution unit which determines on the basis of a domain name of the other node apparatus contained in one of the name resolution query and the name resolution response whether the other node apparatus is an encrypted communication target node, and the name resolution proxy unit comprising an encrypted communication path setting unit which registers, in the encrypted communication path setting table, the IP address of the other node apparatus resolved by the name resolution response if the other node apparatus is an encrypted communication target node.

According to the present invention, there is provided an encrypted communication system characterized by comprising a client node apparatus in which an application that communicates with another node apparatus connected to a network operates, a communication encryption node apparatus connected to the client node apparatus through the network, and a name resolution server which resolves an IP address of each of the node apparatuses, the communication encryption node apparatus comprising a data transmission/reception unit provided in a kernel unit, and a name resolution proxy unit which relays a name resolution query transmitted from the application to the name resolution server to resolve the IP address of the other node apparatus and a name resolution response as a response to the name resolution query, the data transmission/reception unit comprising an encrypted communication path setting table which holds a correspondence between a communication partner IP address and an intercept address, and a communication encryption unit which receives a data packet transmitted from the application, reads out, from the encrypted communication path setting table, a communication partner IP address corresponding to an intercept address set as a destination address of the data packet, sets the readout communication partner IP address as the destination address of the data packet, and encrypts and transmits the set data packet, the name resolution server comprising a communication method resolution unit which determines on the basis of a domain name of the other node apparatus contained in one of the name resolution query and the name resolution response whether the other node apparatus is an encrypted communication target node, and the name resolution proxy unit comprising an encrypted communication path setting unit which registers, in the encrypted communication path setting table, a correspondence between the IP address of the other node apparatus resolved by the name resolution response and an intercept address that is not used in any other communication session if the other node apparatus is an encrypted communication target node, and a name resolution query/response transmission/reception unit which transmits, to the application as the name resolution response, the intercept address corresponding to the IP address of the other node apparatus contained in the name resolution response received from the name resolution server.

According to the present invention, there is provided a program which causes a computer included in a node apparatus in which an application that communicates with another node apparatus connected to a network operates to function as communication encryption means provided in a data transmission/reception unit of a kernel unit, and name resolution proxy means for relaying a name resolution query transmitted from the application to a name resolution server to resolve an IP address of the other node apparatus and a name resolution response as a response to the name resolution query, characterized in that the communication encryption means receives a data packet transmitted from the application and encrypts and transmits the data packet when a communication partner IP address set as the destination address of the data packet is registered in an encrypted communication path setting table that holds a communication partner IP address, and the name resolution proxy means comprises encrypted communication path setting means for registering, in the encrypted communication path setting table, the IP address of the other node apparatus resolved by the name resolution response if it is determined on the basis of a domain name of the other node apparatus contained in one of the name resolution query and the name resolution response that the other node apparatus is an encrypted communication target node.

According to the present invention, there is provided a program which causes a computer included in a communication encryption node apparatus connected, through a network, to a client node apparatus in which an application that communicates with another node apparatus connected to the network operates to function as communication encryption means provided in a data transmission/reception unit of a kernel unit, and name resolution proxy means for relaying a name resolution query transmitted from the application to a name resolution server to resolve an IP address of the other node apparatus and a name resolution response as a response to the name resolution query, characterized in that the communication encryption means receives a data packet transmitted from the application, reads out, from an encrypted communication path setting table that holds a correspondence between a communication partner IP address and an intercept address, a communication partner IP address corresponding to an intercept address set as a destination address of the data packet, sets the readout communication partner IP address as the destination address of the data packet, and encrypts and transmits the set data packet, and the name resolution proxy means comprises encrypted communication path setting means for registering, in the encrypted communication path setting table, a correspondence between the IP address of the other node apparatus resolved by the name resolution response and an intercept address that is not used in any other communication session if it is determined on the basis of a domain name of the other node apparatus contained in one of the name resolution query and the name resolution response that the other node apparatus is an encrypted communication target node, and name resolution query/response transmission/reception means for transmitting, to the application as the name resolution response, the intercept address corresponding to the IP address of the other node apparatus contained in the name resolution response received from the name resolution server.

Effects of the Invention

According to the present invention, the setting cost of an encrypted communication target node in executing encrypted communication with a plurality of communication partners by using a communication encryption function provided by an OS can be reduced. This is because the node type of the communication partner is determined on the basis of a domain name contained in a name resolution query transmitted from an application to resolve the IP address of the communication partner or a name resolution response as a response to the name resolution query.

BRIEF DESCRIPTION OF DRAWINGS

FIG. 2 is a view showing an example of a CUG setting table according to the first embodiment of the present invention;

FIG. 3 is a view showing an example of an encrypted communication path setting table according to the first embodiment of the present invention;

FIG. 4 is a flowchart showing the operation of a DNS Proxy unit according to the first and third embodiments of the present invention upon receiving a name resolution request;

FIG. 7 is a block diagram showing the arrangement of the third embodiment of the present invention;

BEST MODE FOR CARRYING OUT THE INVENTION

The first embodiment of the present invention will be described next in detail with reference to the accompanying drawings.

Figure 1:
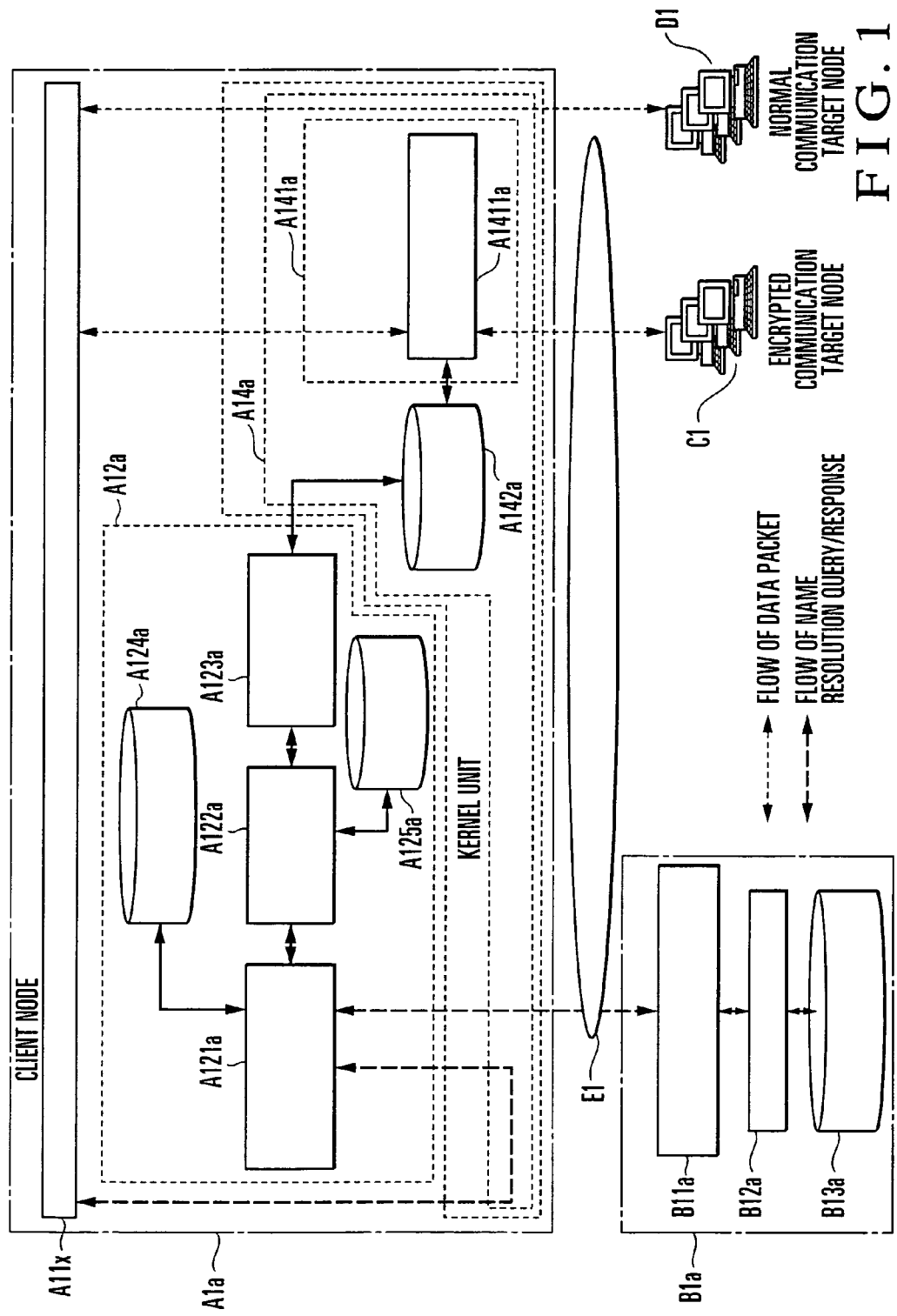
FIG. 1 is a block diagram showing the arrangement of the first embodiment of the present invention.

Referring to FIG. 1, the first embodiment of the present invention is implemented by a client node A1$a$, DNS (Domain Name System) server B1$a$, encrypted communication target node C1, and normal communication target node D1. The client node A1$a$, DNS server B1$a$, encrypted communication target node C1, and normal communication target node D1 are connected through a network E1. The encrypted communication target node C1 executes encrypted communication with the client node A1$a$. The normal communication target node D1 executes normal communication without encryption with the client node A1$a$.

The client node A1$a$ includes an application A11$x$, DNS Proxy unit A12$a$, and data transmission/reception unit A14$a$. The data transmission/reception unit A14$a$ is provided in the kernel unit to transmit/receive a data packet.

The application A11$x$ is software such as a Web browser, e-mail software, or video conference software to implement its purpose by using a computer. The application A11$x$ has a function of requesting to resolve the name of a communication partner to an IP address.

In the scope of this specification, "name" indicates all identifiers directly or indirectly corresponding to one or a plurality of IP addresses or an IP address scope (more specifically, when a "name" is given, one or a plurality of IP addresses or an IP address scope can be specified directly or indirectly: a "name" need not always be specified from an IP address or IP address scope).

For example, the "name" includes the following identifiers.

Identifier A having a correspondence of A←→1.2.3.4 ("1.2.3.4" is an example of an IP address)

Identifier B having a correspondence of 1.2.3.0/24 ("1.2.3.0/24" is an example of an IP address scope)

Identifier C having correspondences of C←→1.2.3.4 and C←→5.6.7.8

Identifier D having a correspondence of D←→A

A typical example of the name currently used in the Internet is a domain name (e.g., "sato.biglobe.ne.jp" or "suzuki.nec.com": the domain name is also called FQDN (Fully Qualified Domain Name)).

Specifying one or a plurality of IP addresses or an IP address scope corresponding to a name on the basis of the name is generally called name resolution. A typical mechanism of name resolution is a DNS. When a DNS is used, a domain name can be resolved to an IP address. Other examples of the name resolution mechanism are NIS (Network Information Service) and WINS (Windows® Internet Name Service). In this specification, "name resolution" is not limited to the above-described examples and is used as a term to indicate "specifying one or a plurality of IP addresses or an IP address scope corresponding to a name on the basis of the name" (for example, the name resolution mechanism also includes a Web server with a CGI (Common Gateway Interface) that receives a character string and displays an IP address corresponding to it).

For the descriptive convenience, a domain name and DNS will be exemplified as a name and name resolution mechanism, respectively. However, the following explanation can be applied to any name and name resolution mechanism. In application, a domain name and DNS are replaced with a name and name resolution, respectively (e.g., DNS server→name resolution server, DNS query message→name resolution query message, and DNS response message→name resolution response message).

In this embodiment, the application A11$x$ requests resolution of domain name of communication partner→IP address by transmitting a DNS query message to the loopback address (e.g., "127.0.0.1") assigned to the DNS Proxy unit A12$a$. Hence, the DNS query message transmitted from the application A11$x$ is received by the DNS Proxy unit A12$a$. A loopback address is an IP address used for closed communication in a node and generally corresponds to an IP address within a scope of "127.0.0.0/8".

The application A11$x$ designates an IP address contained in the name resolution result of the DNS response message received from the DNS Proxy unit A12$a$ to the destination address of a transmission data packet and transmits the data.

Generally, the function of receiving a name resolution request from the application and creating/transmitting a DNS query message and the function of acquiring a name resolution result from a DNS response message received from the DNS server and transferring the name resolution result to the application are provided as a system function of the fundamental software (also referred to as an OS (Operating System)) of the node. In this specification, these functions will be expressed as "causing an application to transmit/receive a DNS message" for the descriptive convenience, including the above-described expressions.

The DNS Proxy unit A12$a$ includes a DNS query/response transmission/reception unit A121$a$, communication method resolution unit A122$a$, encrypted communication path setting unit A123$a$, DNS server address setting table A124$a$, and CUG (Closed User Group) setting table A125$a$.

The DNS Proxy unit A12$a$ has a function of, upon receiving a name resolution request from the application A11$x$, causing the DNS server B1$a$ to resolve the IP address of the communication partner of the application A11$x$, determining the node type of the communication partner (the node type of a communication partner indicates whether a communication partner is an encrypted communication target node or a target node of normal communication (to be referred to as a normal communication target node hereinafter)), if the communication partner is an encrypted communication target node, registering the IP address of the encrypted communication target node in an encrypted communication path setting table A142$a$ provided in the data transmission/reception unit A14$a$. If the communication partner is a normal communication target node, registration is not executed.

The arrangement of the DNS Proxy unit A12a will be described below. The DNS query/response transmission/reception unit A121a will be described first.

Upon receiving a DNS query message from the application A11x, the DNS query/response transmission/reception unit A121a transmits the DNS query message to the external DNS server B1a registered in the DNS server address setting table A124a. Upon receiving a DNS response message from the external DNS server B1a as the response to the DNS query message, the DNS query/response transmission/reception unit A121a transfers a name resolution result contained in the DNS response message to the communication method resolution unit A122a. The name resolution result transferred to the communication method resolution unit A122a contains the domain name (i.e., the domain name of the communication partner of the application A11x) as the target of name resolution and the resolved IP address (i.e., the IP address of the communication partner). The DNS query/response transmission/reception unit A121a transfers the name resolution result to the communication method resolution unit A122a and transmits the DNS response message to the application A11x.

The communication method resolution unit A122a will be described next. The communication method resolution unit A122a determines the node type of the communication partner of the application A11x by looking up the CUG setting table A125a on the basis of the name resolution result received from the DNS query/response transmission/reception unit A121a. If the communication partner of the application A11x is an encrypted communication target node, the communication method resolution unit A122a grasps the setting information of an encrypted communication path to be used for communication of the communication partner by looking up the CUG setting table A125a.

The communication method resolution unit A122a uses a domain name as a communication partner identifier to determine the node type. In determining the node type of the communication partner of the application A11x by using a domain name, the communication method resolution unit A122a checks whether the domain name of the communication partner is wholly or partially registered in the CUG setting table A125a as the domain name of the encrypted communication target node. For example, assume that the domain name of the communication partner is "sato.biglobe.ne.jp". In this case, the communication method resolution unit A122a checks whether the domain name "sato.biglobe.ne.jp" or a domain name condition that matches "sato.biglobe.ne.jp" (e.g., a domain prefix such as "sato.*" (indicating a domain name with a fore label "sato"), a domain suffix such as "*.biglobe.ne.jp" (indicating a domain name with a rear label "biglobe.ne.jp"), or an arbitrary domain name condition such as "*.biglobe.*" (indicating an arbitrary domain name including a label "biglobe")) is registered in the CUG setting table A125a as the domain name of the encrypted communication target node.

The communication method resolution unit A122a determines the node type of the communication partner of the application A11x by the above-described method. Upon determining that the node type is an encrypted communication target node, the communication method resolution unit A122a transfers, to the encrypted communication path setting unit A123a, the name resolution result received from the DNS query/response transmission/reception unit A121a and encrypted communication path setting information to be used for communication with the communication partner.

The encrypted communication path setting unit A123a will be described next. The encrypted communication path setting unit A123a has a function of registering, in the encrypted communication path setting table A142a included in the data transmission/reception unit A14a, the IP address of the encrypted communication target node and encrypted communication path setting information to be used for communication with the encrypted communication target node. More specifically, the encrypted communication path setting unit A123a registers, in the encrypted communication path setting table A142a, the IP address of the communication partner contained in the name resolution result of the communication partner of the application A11x received from the communication method resolution unit A122a and encrypted communication path setting information to be used for communication with the communication partner.

The DNS server address setting table A124a will be described next. The address of the external DNS server B1a is registered in the DNS server address setting table A124a. The DNS server address setting table A124a is looked up by the DNS query/response transmission/reception unit A121a in transmitting a DNS query message.

The CUG setting table A125a will be described next. Information about a CUG (Closed User Group) in which the client node A1 participates is registered in the CUG setting table A125a. A CUG indicates a group including two or more specific nodes. Communication in the group is encrypted so that any third party outside the group cannot peep it. That is, any other node in the CUG including the client node A1a as a participant serves as an encrypted communication target node for the client node A1a. The CUG setting table A125a is looked up by the communication method resolution unit A122a to determine the node type of the communication partner of the application A11x. More specifically, the identification information of each node (i.e., encrypted communication target node) in the CUG including the client node A1a as a participant is registered in the CUG setting table A125a. The identification information of a node registered in the CUG setting table A125a is a domain name condition. For example, when "*.myfriends.com" is registered, a communication partner having a domain name (e.g., "sato.myfriends.com") matching "*.myfriends.com" is an encrypted communication target node.

The setting information of an encrypted communication path to be used for communication with a node in the CUG can also be registered in the CUG setting table A125a, although this registration information is not essential. Detailed examples of the encrypted communication path setting information are a communication protocol (e.g., IPsec, SSL (Secure Socket Layer), or TLS (Transport Layer Security)), digital certificate ID (a digital certificate is an electronic certificate to prove self presence and includes, e.g., X.509 of ITU-T (International Telecommunication Union-Telecommunication Standardization Sector) recommendation: in this description, a digital certificate ID indicates an identifier to be used to select a digital certificate to be used by the application A11x in a session), and an encryption algorithm (e.g., DES (Data Encryption Standard), 3DES (triple-DES), or AES (Advanced Encryption Standard)).

FIG. 2 shows an example of the CUG setting table A125a. In a CUG setting table 201 shown in FIG. 2, domain name conditions are registered as encrypted communication target node identification information, and communication protocols, digital certificate IDs, and encryption algorithms are registered as encrypted communication path setting information. For example, the fourth entry of the CUG setting table 201 shown in FIG. 2 is set such that communication partner nodes (e.g., yamada.myfriends.com and sato.myfriends.com) having domain names matching a domain name condition "*.myfriends.com" are encrypted communication target nodes, and encrypted communication with those nodes is executed by using a communication protocol: SSL, digital certificate ID: 11, and encryption algorithm: DES.

When the DNS Proxy unit A12a has the table 201 shown in FIG. 2 as the CUG setting table A125a, the communication method resolution unit A122a determines the node type of the communication partner by using the domain name of the communication partner. For example, assume that the domain name of the communication partner is "taro.nec.co.jp". This domain name is registered in the second entry of the table 201. For this reason, the communication method resolution unit A122a determines that the communication partner is an encrypted communication target node. Assume that the domain name of the communication partner is "yamada.myfriends.com". The domain name itself is not registered in the table 201. However, since the domain suffix ":myfriends.com" is registered in the fourth entry of the table 201, the communication method resolution unit A122a determines even in this case that the communication partner is an encrypted communication target node. If the domain name of the communication partner does not match any of the domain names registered in the table 201, the communication method resolution unit A122a determines that the communication partner is a normal communication target node.

The arrangement of the DNS Proxy unit A12a has been described above.

The data transmission/reception unit A14a will be described next. The data transmission/reception unit A14a includes a communication encryption unit A141a and encrypted communication path setting table A142a. All data packets transmitted from the application A11x to external nodes are intercepted by the data transmission/reception unit A14a and subjected to transmission processing.

The communication encryption unit A141a has an encryption/decryption processing unit A1411a that encrypts/decrypts a data packet. The encryption/decryption processing unit A1411a has a function of looking up the encrypted communication path setting table A142a on the basis of the destination IP address of a data packet received from the application A11x and encrypting the received data packet in accordance with encrypted communication path setting information registered in the table. The encryption/decryption processing unit A1411a also has a function of looking up the encrypted communication path setting table A142a on the basis of the transmission source address of a data packet received from an external communication partner node and decrypting the received data packet in accordance with encrypted communication path setting information registered in the table.

The encrypted communication path setting table A142a will be described next. The IP address of an encrypted communication target node and encrypted communication path setting information to be used for communication with the encrypted communication target node are registered in the encrypted communication path setting table A142a. Registration is dynamically done by the encrypted communication path setting unit A123a. A table 301 shown in FIG. 3 indicates an example of the encrypted communication path setting table A142a. In this example, communication partner IP addresses and encrypted communication path setting information, i.e., communication protocols, digital certificate IDs, and encryption algorithms are registered.

Assume that the data transmission/reception unit A14a holds the table 301 shown in FIG. 3 as the encrypted communication path setting table A142a. A case will be described in which the data transmission/reception unit A14a intercepts a data packet with a destination address "133.11.64.24". When the data transmission/reception unit A14a intercepts a data packet, the communication encryption unit A141a looks up the encrypted communication path setting table A142a. In this case, the second entry of the encrypted communication path setting table A142a corresponds to the intercepted data packet. The communication encryption unit A141a encrypts the data packet in accordance with the setting information (communication protocol: IPsec, digital certificate ID: 10, encryption algorithm: 3DES) registered in the second entry and transmits the data packet.

The arrangement of the data transmission/reception unit A14a has been described above.

The DNS server B1a will be described next. The DNS server B1a executes name resolution requested by a DNS query message and returns a resolution result to the request source by a DNS response message. The DNS server B1a includes a DNS response/query transmission/reception unit B11a, name resolution unit B12a, and address resolution database B13a. These components have the following functions.

The DNS response/query transmission/reception unit B11a receives a DNS query message from the client node A1a and transfers a name resolution request contained in the message to the name resolution unit B12a. The DNS response/query transmission/reception unit B11a also sends a name resolution result received from the name resolution unit B12a to the client node A1 by a DNS response message.

The name resolution unit B12a executes resolution processing for a name resolution request received from the DNS response/query transmission/reception unit B11a by looking up the address resolution database B13a and transfers a name resolution result to the DNS response/query transmission/reception unit B11a.

Domain names and corresponding IP addresses are registered in the address resolution database B13a.

The operation of the client node A1a when the application A11x communicates with the encrypted communication target node C1 or normal communication target node D1 in this embodiment will be described next in detail.

Operations of the client node A1a are roughly classified into an operation executed when the application A11x issues a name resolution request for the domain name of a communication partner and an operation executed when a data packet is transmitted to the communication partner.

The operation of the client node A1a when the application A11x issues a name resolution request will be described first.

The application A11x requests name resolution of a communication partner by transmitting a DNS query message to a loopback address (e.g., "127.1.1.1"). The DNS query message transmitted from the application A11x is received by the DNS Proxy unit A12a (more specifically, the DNS query/response transmission/reception unit A121a in the DNS Proxy unit A12a). Subsequent processing is executed in the DNS Proxy unit A12a.

The operation of the DNS Proxy unit A12a upon receiving a DNS query message from the application A11x will be described with reference to FIG. 4.

Upon receiving a DNS query message from the application A11x (step S101), the DNS query/response transmission/reception unit A121a transfers the received DNS query message to the external DNS server B1a registered in the DNS server address setting table A124a (step S102) and receives a DNS response message from the DNS server B1a as a response (step S103).

The DNS query/response transmission/reception unit A121a extracts a name resolution result from the received DNS response message and transfers the name resolution result to the communication method resolution unit A122a. The communication method resolution unit A122a determines the type (encrypted communication target node or normal communication target node) of the communication partner by looking up the CUG setting table A125a on the basis of the received name resolution result (step S104). If the communication partner is an encrypted communication target node, the communication method resolution unit A122a grasps encrypted communication path setting information registered in the CUG setting table A125a.

When the communication partner is an encrypted communication target node, the communication method resolution unit A122a transfers, to the encrypted communication path setting unit A123a, the name resolution result received from the DNS query/response transmission/reception unit A121a and encrypted communication path setting information acquired from the CUG setting table A125a. Upon receiving the name resolution result and encrypted communication path setting information from the communication method resolution unit A122a, the encrypted communication path setting unit A123a registers these pieces of information in the encrypted communication path setting table A142a (S105). After registration, the DNS query/response transmission/reception unit A121a transmits, to the application A11x, a DNS response message containing the name resolution result received from the external DNS server B1a (S106).

The operation of the client node A1 when the application A11x issues a name resolution request has been described above.

The operation when the application A11x transmits a data packet to a communication partner will be described next.

Upon receiving a DNS response message from the DNS Proxy unit A12a, the application A11x transmits a data packet to an IP address (i.e., the IP address of the communication partner) contained in the name resolution result given by the DNS response message. All transmitted data packets are intercepted by the data transmission/reception unit A14a.

When the data transmission/reception unit A14a intercepts the data packet, the communication encryption unit A141a looks up the encrypted communication path setting table A142a on the basis of the destination IP address of the received data packet and checks whether the destination IP address is registered in the IP address of the encrypted communication target node. When the node is an encrypted communication target node, the data packet is encrypted and transmitted. When the node is a normal communication target node, the data packet is directly transmitted.

In the above description, the node type of the communication partner is determined after the DNS Proxy unit A12a receives the name resolution result of the communication partner from the external DNS server B1a. In this embodiment, as another method, the node type of the communication partner may be determined before the DNS Proxy unit A12a requests the external DNS server B1a to execute name resolution of the communication partner. In this case, control can be done such that, e.g., the DNS server to receive the name resolution request (i.e., receive a DNS query message) changes depending on the node type of the communication partner. Hence, a DNS server dedicated to an encrypted communication group can be formed.

The effects of this embodiment will be described below.

In the prior art, when the kernel unit of the OS executes communication encryption, as in this embodiment, the node type of the communication partner is determined on the basis of information contained in a data packet. Hence, the identification information of the encrypted communication target node cannot be designated by using a domain name. In this embodiment, however, the DNS Proxy unit A12a intercepts a DNS message exchanged between the DNS server B1a and the application A11x in requesting name resolution of the communication partner and determines the node type of the communication partner on the basis of information contained in the DNS message. Hence, the identification information of the encrypted communication target node can be designated by using a domain name. When identification information is designated by a domain name, setting need not be changed even when the IP address of the communication partner dynamically changes (e.g., when the IP address is assigned by DHCP), unlike a case wherein designation is done by using an IP address. In addition, an encrypted communication target node can also be designated by a domain name condition (e.g., a domain prefix such as "sato.*" (indicating an FQDN with front label "sato"), a domain suffix such as "*.biglobe.ne.jp" (indicating an FQDN with a back label "biglobe.ne.jp"), or a condition such as "*.biglobe.*" (indicating an arbitrary FQDN including a label "biglobe")). When communication is to be executed by using an encrypted communication path with setting common to a plurality of nodes included in a group, the setting can be done for each group by using a domain name condition common to nodes included in each group (e.g., defining the domain suffix of nodes in a group as "*.myfriends.com"). Hence, the setting cost can be reduced. If setting is to be done simply for each group, an IP address scope such as "10.2.1.0/24" can also be used. However, if the IP addresses of nodes included in a group do not belong to the same IP address scope, the IP address scope cannot be used as the identification information of the group, and it is impossible to freely form a group including arbitrary nodes.

To the contrary, a domain name can freely be added independently of the IP address. Hence, a group can freely be formed.

The second embodiment of the present invention will be described next in detail with reference to the accompanying drawings.

Figure 5:
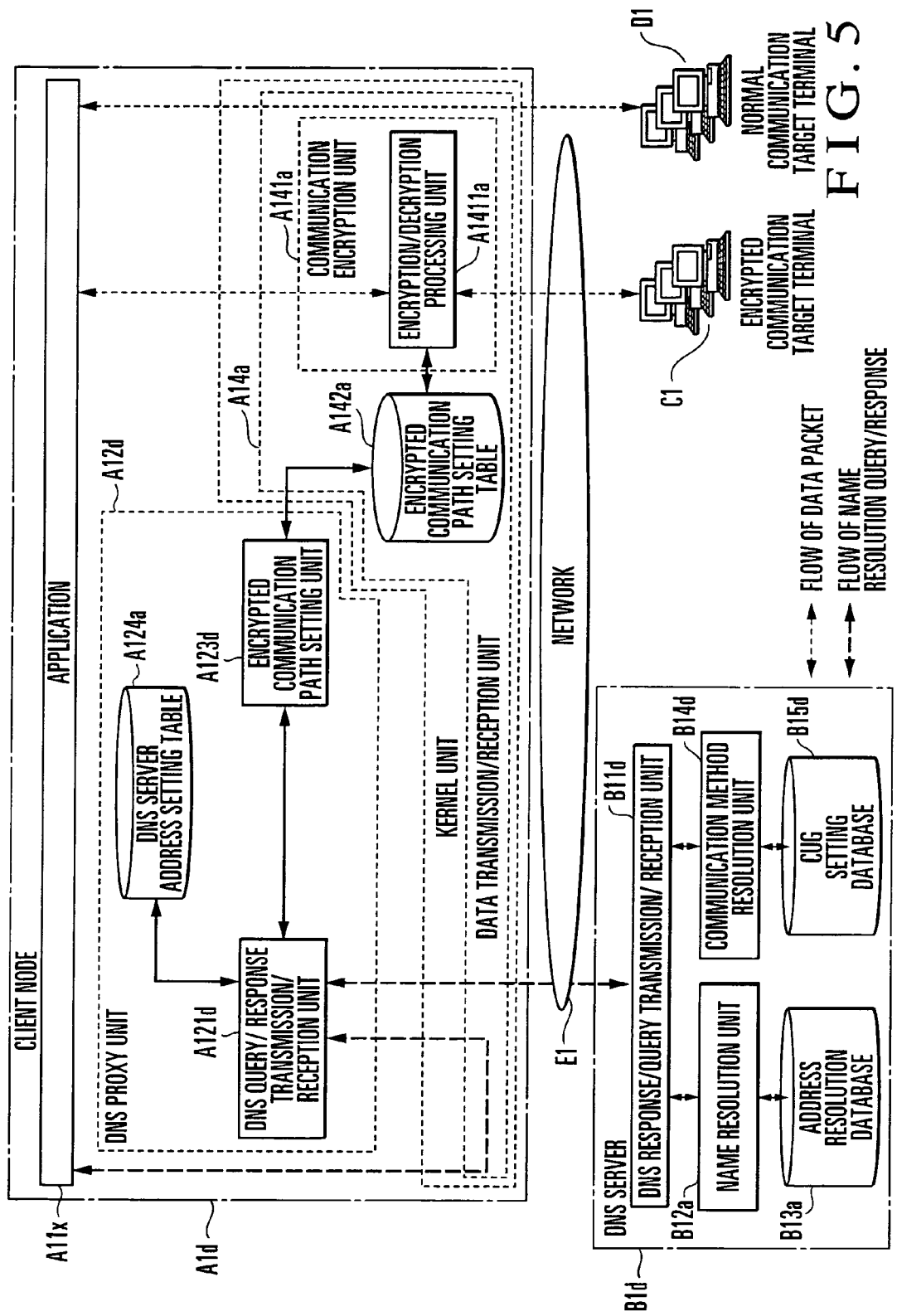
FIG. 5 is a block diagram showing the arrangement of the second embodiment of the present invention.

Referring to FIG. 5, the second embodiment of the present invention is different from the first embodiment of the present invention in that a communication method resolution unit and a CUG setting table are included not in a DNS Proxy unit A12d but in a DNS server B1d. In this embodiment, the node type of the communication partner of an application A11x and encrypted communication path setting information to be used when the communication partner is an encrypted communication target node are resolved not in a client node A1d but by the external DNS server B1d.

The second embodiment will be described below with the focus on different points from the first embodiment of the present invention (i.e., the DNS Proxy unit A12d and DNS server B1d).

The DNS Proxy unit A12d will be described first. In this embodiment, the DNS Proxy unit A12d has a function of requesting the DNS server B1d to execute name resolution of the communication partner of the application A11x and resolve the node type of the communication partner (and if the communication partner is an encrypted communication target node, encrypted communication path setting information to be used for communication with the communication partner), and if the communication partner is an encrypted communication target node, registering the encrypted communication path setting information resolved by the DNS server B1d in an encrypted communication path setting table A142a.

In addition to a function of requesting the external DNS server B1d to execute name resolution of the communication partner of the application A11x, a DNS query/response transmission/reception unit A121d has a function of requesting the external DNS server B1d to resolve the node type of the communication partner of the application A11x and, if the communication partner is an encrypted communication target node, encrypted communication path setting information to be used for communication with the communication partner. Upon receiving a DNS query message, the DNS query/response transmission/reception unit A121d transfers the message to the DNS server B1d and executes reception processing of a DNS response message received as a response. The DNS response message received from the DNS server B1d contains the node type information of the communication partner in addition to the name resolution result of the communication partner of the application A11x. If the communication partner is an encrypted communication target node, the DNS response message also contains encrypted communication path setting information to be used for communication with the communication partner.

When the DNS response message indicates that the communication partner is a normal communication target node and an encrypted communication target node, the DNS query/response transmission/reception unit A121d notifies, by the DNS response message, the application A11x of the name resolution result of the communication partner contained in the received message. When the DNS response message indicates that the communication partner is an encrypted communication target node, the DNS query/response transmission/reception unit A121d transfers, to an encrypted communication path setting unit A123d, the name resolution result of the communication partner and the encrypted communication path setting information to be used for communication with the communication partner. The encrypted communication path setting unit A123d has the same functions as those of the encrypted communication unit A123a of the first embodiment of the present invention and registers information received from the DNS query/response transmission/reception unit A121d in the encrypted communication path setting table A142a.

The address of the external DNS server B1d is registered in a DNS server address setting table A124a.

The arrangement of the DNS Proxy unit A12d has been described above.

The DNS server B1d will be described next. In addition of a name resolution function provided in a normal DNS server, the DNS server B1d has a function of resolving the type of a node as the target of a name resolution request and, if the node is an encrypted communication target node, a function of resolving encrypted communication path setting information to be used for communication with the node.

The DNS server B1d includes a DNS response/query transmission/reception unit B11d, name resolution unit B12a, address resolution database B13a, communication method resolution unit B14d, and CUG setting database B15d. Each unit will be described below.

The DNS response/query transmission/reception unit B11d transfers a name resolution request (more specifically, the domain name of the name resolution target contained in the received DNS query message or the identifier (e.g., the IP address or domain name) of the client node A1d) received from the client node A1d to the name resolution unit B12a and receives a name resolution result (more specifically, the IP address of the resolution result is contained in addition to information contained in the name resolution request) from the name resolution unit B12a. The DNS response/query transmission/reception unit B11d transfers the name resolution result to the communication method resolution unit B14d and receives the type information of the name resolution request target node from the communication method resolution unit B14d. If the name resolution request target node is an encrypted communication node, the DNS response/query transmission/reception unit B11d receives encrypted communication path setting information to be used for communication with the node. The DNS response/query transmission/reception unit B11d creates a DNS response message on the basis of the pieces of information received from the name resolution unit B12a and communication method resolution unit B14d and transmits the DNS response message to the client node A1d.

Upon receiving a name resolution request, the name resolution unit B12a executes name resolution by looking up the address resolution database B13a and transfers the name resolution result to the DNS response/query transmission/reception unit B11d.

Domain names and corresponding IP addresses are registered in the address resolution database B13a.

Upon receiving the name resolution result from the DNS response/query transmission/reception unit B11d, the communication method resolution unit B14d resolves the type of the communication partner by looking up the CUG setting database B15d. If the communication partner is an encrypted communication target node, the communication method resolution unit B14d also resolves encrypted communication path setting information to be used for communication with the node. A detailed example of the resolution operation will be described later. After this processing, the communication method resolution unit B14d transfers the resolution result to the DNS response/query transmission/reception unit B11d.

The identification information of each encrypted communication target node is registered in the CUG setting database B15d. Encrypted communication path setting information to be used for communication can also be registered. These pieces of information can be registered as indicated by a table 201 shown in FIG. 2. The identification information of each encrypted communication target node may be registered in the CUG setting database B15d in correspondence with each client node or each group of client nodes. With this registration method, such control is possible that even with a communication method resolution request for the same node, the communication method changes depending on the client node. For example, when the type of a certain node is resolved as an encrypted communication target node for a specific client node, encrypted communication from the specific client node can be permitted.

Figure 6:
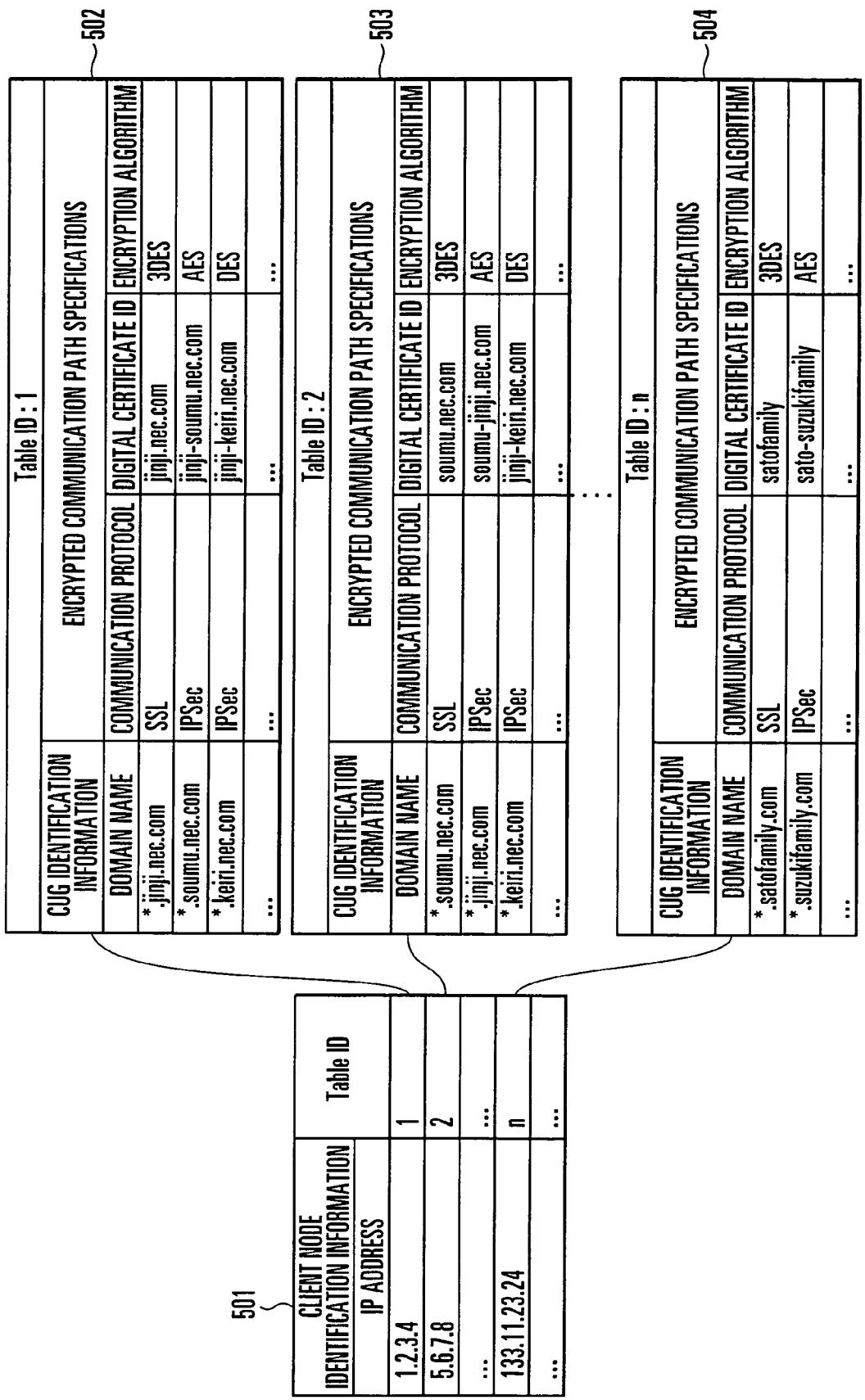
FIG. 6 is a view showing an example of a CUG setting database according to the second embodiment of the present invention.

FIG. 6 shows a detailed example of the CUG setting database B15d. The CUG setting database B15d shown in FIG. 6 includes the following two kinds of tables (1) and (2) in which the identification information of encrypted communication target nodes and encrypted communication path setting information to be used for communication are registered for each client node or each group of client nodes.

(1) A table in which the identification information of encrypted communication target nodes and encrypted communication path setting information to be used for communication are registered. Tables 502 to 504 are of this type. In the tables 502 to 504, the identification information of each encrypted communication target node is registered in the form of a domain name. As encrypted communication path setting information (encrypted communication path specifications), communication protocols, digital certificate IDs, and encryption algorithms are registered.

(2) A table in which the identification information of client nodes and the identifiers of the tables (1) to be looked up for communication method resolution triggered by reception of a DNS query message from the client nodes are registered. A table 501 is of this type. In the table 501, the identification information of each client node is registered in the form of an IP address. The identifiers of the tables 502 to 504 to be looked up for communication method resolution triggered by reception of a DNS query message from the client nodes with the IP addresses are registered.

A detailed example of the communication method resolution operation when the DNS server B1$d$ holds the CUG setting database B15$d$ shown in FIG. 6 will be described below.

For example, when a DNS query message is received from a client node with an IP address "1.2.3.4", the table 501 is looked up. The first entry that matches the client node identification information (IP address: 1.2.3.4) is checked. On the basis of the registered contents of the first entry, the table with Table ID 1, i.e., the table 502 is looked up. When the domain name as the target of name resolution request of the client node is "kojima.jinji.nec.com", the first entry of the table 502 is checked. The communication method is resolved to [communication node type: encrypted communication target node, communication protocol: SSL, digital certificate ID: jinji.nec.com, encryption algorithm: 3DES].

When a client node with an IP address "5.6.7.8" requests name resolution of "kojima.jinji.nec.com" in the same way as described above, the second entry of the table 503 is finally checked. The communication method is resolved to be different from the above example, i.e., to [communication node type: encrypted communication target node, communication protocol: IPsec, digital certificate ID: soumu-jinji.nec.com, encryption algorithm: AES].

When a client node with an IP address "133.11.23.24" requests name resolution of "kojima.jinji.nec.com" in the same way as described above, the table 504 is looked up. However, no entry matching "kojima.jinji.nec.com" is registered in the table 504. Hence, the communication method is resolved to [communication node type: normal communication target node].

The operations of the client node A1$d$ and DNS server B1$d$ of this embodiment will be described next.

The operation of the client node A1$d$ will be described first. Operations of the client node A1$d$ are roughly classified into an operation executed when the application A11$x$ issues a name resolution request for the domain name of a communication partner and an operation executed when a data packet is transmitted to the communication partner. The latter operation is the same as that described in the first embodiment of the present invention, and a description thereof will be omitted. The operation in requesting name resolution is different from that of the first embodiment of the present invention in the operation after receiving a DNS response message from the external DNS server (from step S104 in FIG. 4). The operation after receiving a DNS response message from the external DNS server will be described below.

Upon receiving a DNS response message from the DNS server B1$d$, the DNS query/response transmission/reception unit A121$d$ creates a new DNS response message on the basis of the name resolution result contained in the received DNS response message, and transmits the DNS response message to the application A11$x$. The DNS query/response transmission/reception unit A121$d$ also checks the node type information of the communication partner contained in the message. If the communication partner is an encrypted communication target node, the DNS query/response transmission/reception unit A121$d$ transfers, to the encrypted communication path setting unit A123$d$, the name resolution result of the communication partner contained in the DNS response message received from the DNS server B1$d$ and encrypted communication path setting information to be used for communication with the communication partner. The encrypted communication path setting unit A123$d$ registers, in the encrypted communication path setting table A142$a$, the information of the encrypted communication target node in accordance with the same procedures as in the operation of the first embodiment of the present invention.

Upon receiving the DNS response message, the application A11$x$ designates, as the destination address, the address contained in the name resolution result given by the DNS response message and transmits a data packet.

The operation of the DNS server B1$d$ will be described next. Upon receiving a DNS query message from the client node A1$d$, the DNS server B1$d$ executes name resolution of the communication partner of the client node A1$d$. The DNS server B1$d$ also resolves the communication method to be employed for communication between the client node A1$d$ and the communication partner. More specifically, the DNS server B1$d$ resolves the node type of the communication partner, and if the node is an encrypted communication target node for the client node A1$d$, resolves encrypted communication path setting information to be used for communication with the node. The DNS server B1$d$ transmits the resolution result to the client node A1$d$ by a DNS response message.

The effects of this embodiment will be described next. In this embodiment, the DNS server B1$d$ unitarily manages the identification information of encrypted communication target nodes and encrypted communication path setting information to be used for communication. For this reason, individual client nodes need not set and hold the information. Especially in communication executed by a group including a plurality of client nodes, even when encrypted communication path setting information or the like is changed, one change in the DNS server B1$d$ suffices. Hence, the information on the DNS server B1$d$ can efficiently be shared in the group.

The third embodiment of the present invention will be described next with reference to the accompanying drawings.

Referring to FIG. 7, the third embodiment of the present invention is different from the first embodiment of the present invention in that a client node A1$g$ includes neither DNS Proxy unit nor communication encryption module, and these modules are included in an external communication encryption node F1$a$. More specifically, this embodiment is different from the first embodiment of the present invention mainly in the following two points.

(1) The node type (i.e., whether the communication partner is an encrypted communication target node or normal communication target node) of the communication partner of the client node A1$g$ and encrypted communication path setting information to be used for communication with the communication partner when the communication partner is an encrypted communication target node are resolved by the communication encryption node F1$a$.

(2) When the client node A1$g$ communicates with an encrypted communication target node, communication encryption processing is executed by the communication encryption node F1$a$.

The third embodiment will be described below with the focus on different points from the first embodiment of the present invention.

The client node A1$g$ will be described first. The client node A1$g$ includes an application A11$x$ and a data transmission/reception unit A14$x$. The application A11$x$ and data transmission/reception unit A14$x$ have the same functions as those described in the first embodiment of the present invention. However, the data transmission/reception unit A14$x$ has neither communication encryption unit nor encrypted communication path setting table, unlike the first embodiment of the present invention. In this embodiment, the address of the communication encryption node F1a is set in the client node A1g as a DNS server.

The communication encryption node F1a will be described next. The communication encryption node F1a includes a DNS Proxy unit DNS Proxy unit F12a and the data transmission/reception unit A14x.

The DNS Proxy unit F12a will be described first. The DNS Proxy unit F12a has the same arrangement as that of the DNS Proxy unit A12a of the first embodiment of the present invention. The DNS Proxy unit F12a has a function of determining the node type of the communication partner of the client node A1g and registering encrypted communication path setting information in an encrypted communication path setting table F142a. The DNS Proxy unit F12a is different from the DNS Proxy unit A12a of the first embodiment of the present invention in the following two points.

(1) The DNS Proxy unit F12a executes reception processing of a name resolution request from the external client node A1g.

(2) When the communication partner of the client node A1g is an encrypted communication target node, the DNS Proxy unit F12a converts the IP address of the communication partner into an intercept address and sends it as a name resolution result in response to a name resolution request for the communication partner. An intercept address indicates an address that allows the communication encryption node F1a to intercept a transmission data packet of the client node A1g when the address is designated as the destination address of the data packet. A detailed example is the IP address of the communication encryption node F1a itself. This will be described later in detail. As will be described later, the IP address of the communication partner is directly used according to circumstances. In that case, the IP address of the communication partner is sent as a name resolution result even after the IP address of the communication partner is converted into the intercept address.

Each module included in the DNS Proxy unit F12a will be described below.

A DNS query/response transmission/reception unit F121a has the same functions as those of the DNS query/response transmission/reception unit A121a of the first embodiment of the present invention except that a DNS response/query message is transmitted/received to/from the external client node A1g.

A communication method resolution unit F122a has the same functions as those of the communication method resolution unit A122a of the first embodiment of the present invention.

An encrypted communication path setting unit F123a is different from the encrypted communication path setting unit A123a of the first embodiment of the present invention in that the IP address of the communication partner contained in a name resolution result received from the communication method resolution unit F122a is mapped to an intercept address. A detailed operation will be described below.

Upon receiving a name resolution result from the communication method resolution unit F122a, the encrypted communication path setting unit F123a selects an intercept address that is not used in any other communication session by looking up the encrypted communication path setting table F142a, maps the IP address of the communication partner of the client node A1g, which is contained in the name resolution result, to the intercept address, and sends the intercept address to the DNS query/response transmission/reception unit F121a. The encrypted communication path setting unit F123a also registers, in the encrypted communication path setting table F142a, the correspondence between the selected intercept address, the name resolution result received from the communication method resolution unit F122a, and encrypted communication path setting information to be used for communication with the communication partner of the client node A1g.

The same information as in the DNS server address setting table A124a of the first embodiment of the present invention is registered in a DNS server address setting table A124a.

In a CUG setting database F125a, the identification information of encrypted communication target nodes (CUG participant nodes) and encrypted communication path setting information to be used for communication are registered, as in the CUG setting table A125a of the first embodiment of the present invention. The CUG setting database F125a is looked up by the communication method resolution unit F122a to determine the type of the communication partner of the client node A1g. In the CUG setting database F125a, node identification information and encrypted communication path setting information may be registered for each encrypted communication target node, as in the CUG setting table A125a of the first embodiment of the present invention. Alternatively, a plurality of encrypted communication target nodes may be put into a group, and node identification information and encrypted communication path setting information can be registered for each group. In the CUG setting database F125a, the identification information of each encrypted communication target node and encrypted communication path setting information to be used for communication may be registered for each client node or each group of client nodes, as in the CUG setting database B15d of the second embodiment of the present invention. In this case, the pieces of information are registered in a form shown in, e.g., FIG. 6.

The arrangement of the DNS Proxy unit F12a has been described above.

An communication encryption unit F141a and encrypted communication path setting table F142a of the data transmission/reception unit A14x will be described next.

Figures 8, 9:
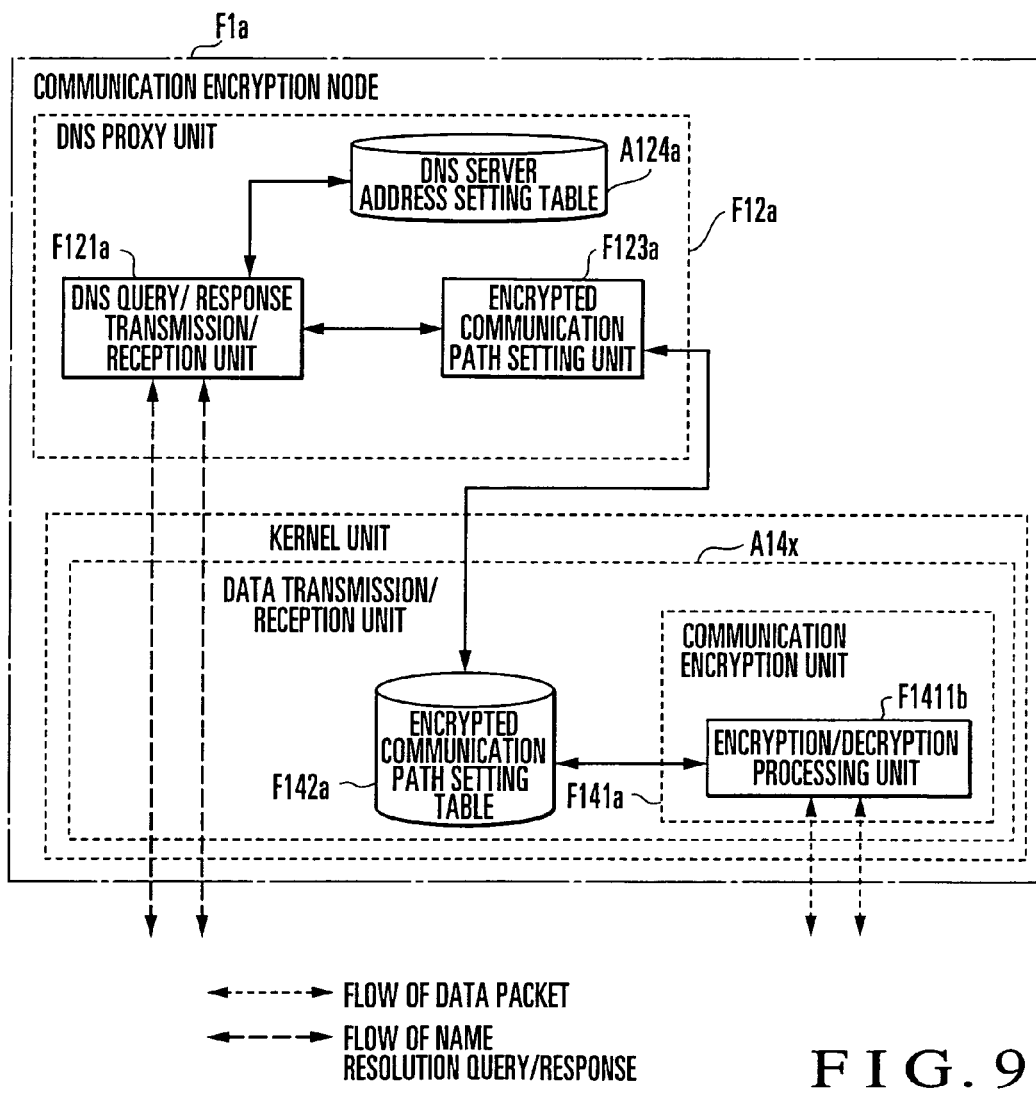
FIG. 8 is a view showing an example of an encrypted communication path setting table according to the third embodiment of the present invention.
FIG. 9 is a block diagram showing the arrangement of a client node according to a modification to the third embodiment of the present invention.
Figure 10:
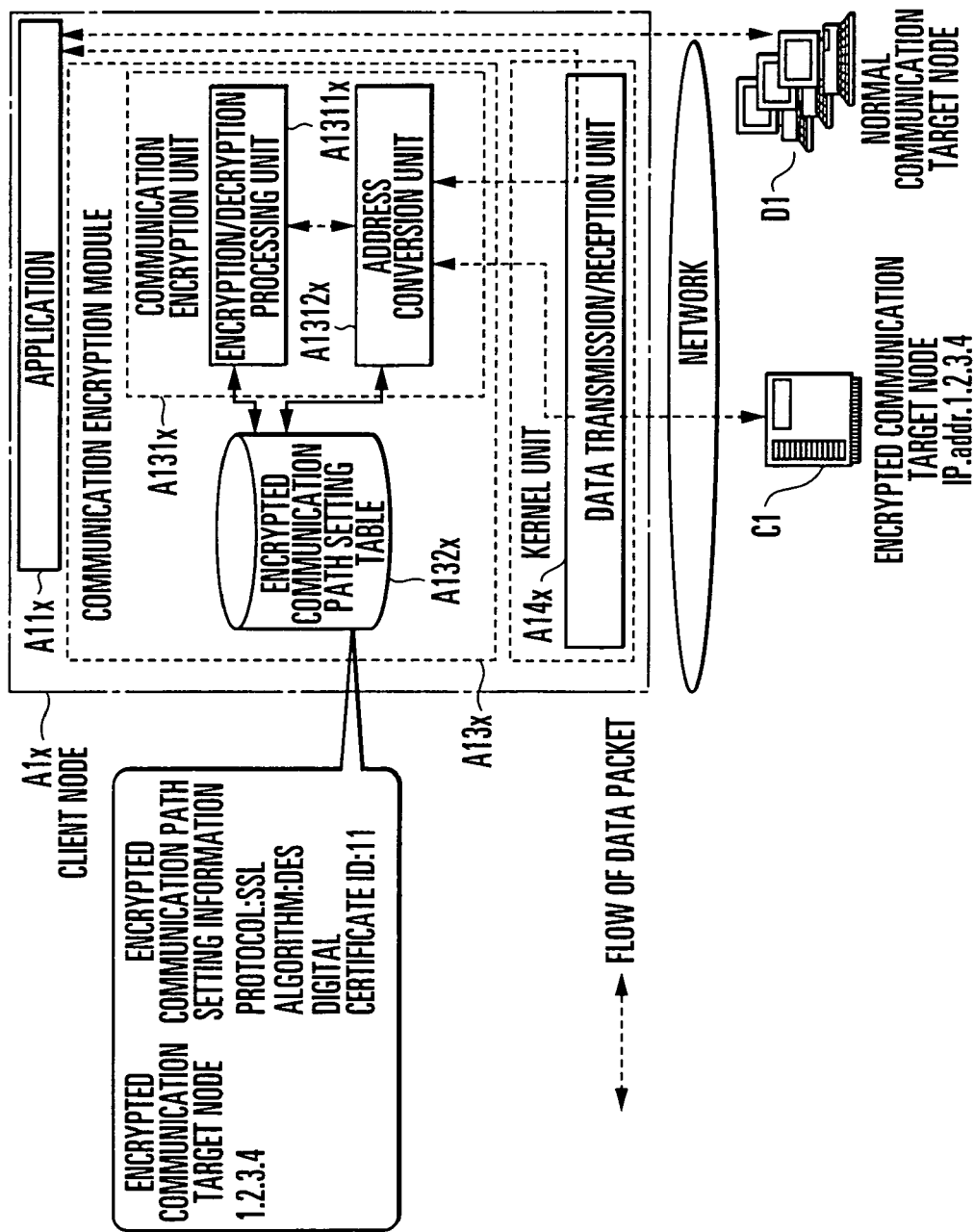
FIG. 10 is a view showing the arrangement of a conventional encrypted communication system using a communication encryption module.
Figure 11:
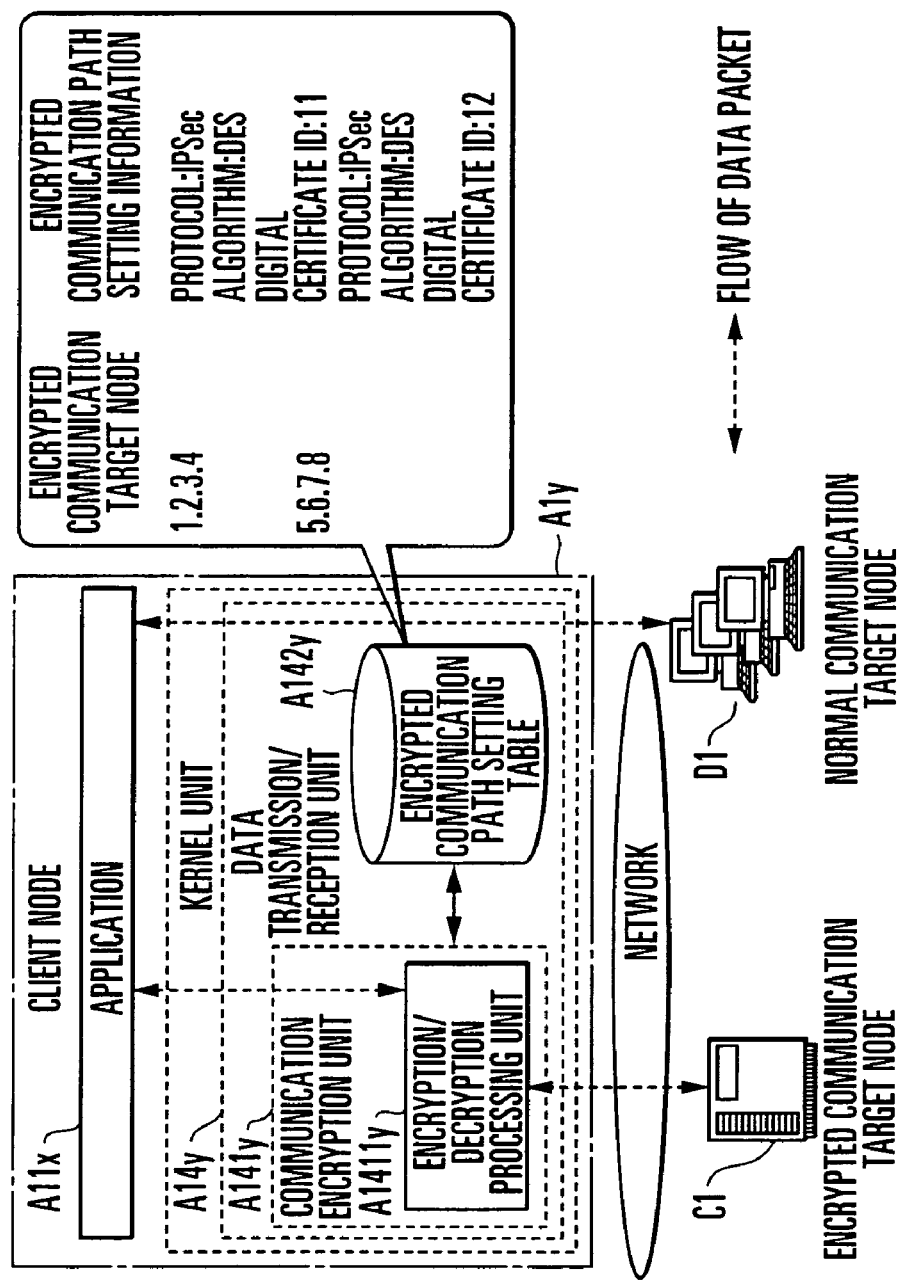
FIG. 11 is a view showing the arrangement of a conventional encrypted communication system using the communication encryption function of the kernel unit of an OS.

The name resolution result (e.g., the IP address of the communication partner) of the communication partner of the client node A1g, encrypted communication path setting information to be used for communication with the communication partner, and corresponding intercept address are registered in the encrypted communication path setting table F142a. The encrypted communication path setting table F142a is looked up by the encrypted communication path setting unit F123a to map the IP address of the communication partner of the client node A1g to an intercept address and by the communication encryption unit F141a to execute communication encryption processing. FIG. 8 shows an example of the encrypted communication path setting table F142a. In an encrypted communication path setting table 601 shown in FIG. 8, the IP address and domain name of the communication partner of the client node A1g are registered as information contained in the name resolution result for each corresponding intercept address.

The communication encryption unit F141a encrypts a data packet transmitted from the client node A1 to an encrypted communication target node. Detailed procedures of the encryption processing will be described below.

When the client node A1g communicates with an encrypted communication target node, an intercept address is designated as the destination address of a data packet transmitted from the client node A1g (because an intercept address is sent from the DNS Proxy unit F12a as a name resolution result in response to a name resolution request for an encrypted communication target node). All data packets are intercepted by the communication encryption node F1a. The intercepted data packet is transferred to the communication encryption unit F141a. The communication encryption unit F141a grasps the IP address of the communication partner corresponding to the destination intercept address and encrypted communication path setting information to be used for communication with the communication partner by looking up the encrypted communication path setting table F142a on the basis of the destination address of the intercepted data packet. The communication encryption unit F141a encrypts the intercepted data packet in accordance with the grasped encrypted communication path setting information and transmits the data packet to the communication partner of the client node A1g.

A detailed example of the above-described communication encryption processing will be described below. As a detailed example, a case wherein the data transmission/reception unit A14x holds a table 601 shown in FIG. 8 as the encrypted communication path setting table F142a is assumed. An example will be described in which the communication encryption node F1a intercepts a data packet with a destination address "fe80::3090" transmitted from the client node A1g.

First, the communication encryption unit F141a looks up the encrypted communication path setting table F142a and grasps an entry corresponding to the destination address "fe80::3090". In this case, the second entry of the table 601 corresponds to the destination address. The communication encryption unit F141a consequently acquires "communication protocol: SSL, digital certificate ID: 10, encryption algorithm: 3DES" as encrypted communication path setting information to be used for communication. The communication encryption unit F141a rewrites the destination address of the intercepted data packet from "fe80::3090" to "aa91::1001" as the IP address of the communication partner, encrypts the data packet by the 3DES algorithm in accordance with the encrypted communication path setting information, and transmits the data packet to the communication partner by the SSL protocol.

Detailed procedures of the communication encryption processing by the communication encryption unit F141a have been described above.

IP addresses usable as an intercept address will be described next.

For example, the following two addresses can be used as an intercept address.

(1) The IP address of the communication encryption node F1a itself (2) An arbitrary address outside the address scope of a subnet to which the client node A1g belongs.

When the IP address (1) of the communication encryption node F1a itself is used as an intercept address, the communication encryption node F1a must be assigned a plurality of IP addresses. The reason will be described. The communication encryption node F1a identifies the communication partner of the client node A1g on the basis of the intercept address designated as the destination address of a data packet transmitted from the client node A1g. Hence, if a plurality of communication partners or client nodes are assumed to be used, a plurality of IP addresses must selectively be used. The larger the number of IP addresses is, the larger the number of usable communication partners or client nodes is. For this reason, it is convenient that IP addresses should be assigned to the communication encryption node F1a as much as possible.

When an arbitrary address (2) outside the address scope of a subnet to which the client node A1g belongs is used as an intercept address, the communication encryption node F1a must be the default gateway of the client node A1g. When the client node A1g transmits a data packet to an address outside the address scope of the subnet to which the client node A1g belongs, the data packet passes through the communication encryption node F1a serving as the default gateway for routing processing. If the communication partner of the client node A1g is present outside the subnet to which the client node A1g belongs, the IP address of the communication partner can directly be used as an intercept address.

The operation of the communication encryption node F1a after the client node A1g requests name resolution of the communication partner until communication with the communication partner starts in this embodiment will be described next.

Operations of the communication encryption node F1a are classified into an operation upon receiving a DNS query from the client node A1g and an operation upon intercepting a data packet transmitted from the client node A1g.

The operation upon receiving a DNS query from the client node A1g will be described with reference to FIG. 4.

When the communication encryption node F1a receives a DNS query message from the client node A1g (step S101), the DNS query/response transmission/reception unit F121a transmits the received DNS query message to an external DNS server B1a registered in the DNS server address setting table F124a (step S102) and receives a DNS response message from the DNS server B1a as a response (step S103).

The DNS query/response transmission/reception unit F121a extracts a name resolution result from the received DNS response message and transfers the name resolution result to the communication method resolution unit F122a.

The communication method resolution unit F122a determines the node type (encrypted communication target node or normal communication target node) of the communication partner by looking up the CUG setting database F125a on the basis of the received name resolution result (step S104). The subsequent operation changes depending on the type of the communication partner.

A case wherein the communication partner is a normal communication target node will be described first. In this case, the communication method resolution unit F122a sends the determination result to the DNS query/response transmission/reception unit F121a. The DNS query/response transmission/reception unit F121a newly creates a DNS response message on the basis of the name resolution result received from the DNS server B1a and transmits the DNS response message to the client node A1g (step S106).

Upon receiving the DNS response message, the client node A1g transmits a data packet by setting, as the destination address, the IP address of the communication partner given by the received DNS response message. In this case, the data packet transmitted from the client node A1g is transmitted directly to the communication partner without intervention of the communication encryption node F1a so that normal communication with the communication partner is executed.

A case wherein the communication partner is an encrypted communication target node will be described next. In this case, the communication method resolution unit F122a grasps, from the CUG setting database F125a, encrypted communication path setting information to be used for communication with the communication partner of the client node A1g and transfers the encrypted communication path setting information to the encrypted communication path setting unit F123a together with the name resolution result received from the DNS query/response transmission/reception unit F121a.

Upon receiving the name resolution result and encrypted communication path setting information, the encrypted communication path setting unit F123a maps the IP address of the communication partner of the client node A1g to an intercept address that is not used in any other communication session by looking up the encrypted communication path setting table F142a. The encrypted communication path setting unit F123a sends the mapped intercept address to the communication method resolution unit F122a. The encrypted communication path setting unit F123a also registers, in the encrypted communication path setting table F142a, the correspondence between the intercept address, the name resolution result received from the communication method resolution unit F122a, and the encrypted communication path setting information to be used for communication with the communication partner (step S105).

The communication method resolution unit F122a transfers the intercept address received from the encrypted communication path setting unit F123a to the DNS query/response transmission/reception unit F121a.

Upon receiving the intercept address from the communication method resolution unit F122a, the DNS query/response transmission/reception unit F121a creates a DNS response message by rewriting the address of the communication partner contained in the name resolution result received from the DNS server B1a to the intercept address and transmits the DNS response message to the client node A1g. That is, the client node A1g receives the intercept address selected by the encrypted communication path setting unit F123a as the name resolution result for the domain name of the communication partner (step S106).

Upon receiving the DNS response message, the client node A1g designates the intercept address contained in the name resolution result as the destination address and transmits the data packet. As a result, the data packet is intercepted by the communication encryption node F1a and encrypted.

The operation when the communication encryption node F1a receives a DNS query from the client node A1g has been described above.

The operation when the communication encryption node F1a intercepts a data packet transmitted from the client node A1g will be described next.

When the communication encryption node F1a intercepts a data packet transmitted from the client node A1g, the communication encryption unit F141a acquires the IP address of the communication partner and encrypted communication path setting information to be used for communication with the communication partner of the client node A1g by looking up the encrypted communication path setting table F142a on the basis of the destination address (an intercept address is designated) of the data packet. Using the acquired encrypted communication path setting information, the communication encryption unit F141a causes an encryption/decryption processing unit F1411a to encrypt the intercepted data packet, sets the IP address of the communication partner to the destination address of the data packet, and transmits the data packet to the communication partner.

In the above description, the node type of the communication partner, and if the communication partner is an encrypted communication target node, encrypted communication path setting information to be used for communication with the communication partner are resolved in the communication encryption node F1a. This embodiment may employ an arrangement for causing the DNS server B1a to execute the resolution, as in the second embodiment of the present invention. In this case, the DNS server B1a has the same arrangement as that of the DNS server B1b shown in FIG. 5 described in the second embodiment, and the communication encryption node F1a has the arrangement shown in FIG. 9. In this case, the DNS query/response transmission/reception unit F121a has the same functions as those of the DNS query/response transmission/reception unit A121d of the second embodiment of the present invention.

A communication encryption node F1a shown in FIG. 9 comprises the data transmission/reception unit A14x provided in the kernel unit, and a name resolution proxy unit F12a which relays a name resolution query transmitted from the application on a client node (not shown) to the name resolution server (not shown) to resolve the IP address of another node apparatus and a name resolution response as the response to the query.

The data transmission/reception unit A14x comprises the encrypted communication path setting table F142a which holds the correspondence between a communication partner IP address, an intercept address, and encrypted communication path setting information, and the communication encryption unit F141a which receives a data packet transmitted from the application and having the intercept address set as the destination address, reads out, from the encrypted communication path setting table F142a, encrypted communication path setting information and a communication partner IP address corresponding to the intercept address set as the destination address of the data packet, and encrypts the data packet having the readout communication partner IP address set as the destination address in accordance with the readout encrypted communication path setting information and transmits the data packet.

The name resolution server (not shown) comprises, in addition to the functions associated with name resolution, a setting table which holds the correspondence between encrypted communication path setting information and a domain name condition to specify an encrypted communication target node, a communication method resolution unit which determines whether the domain name of the other node apparatus contained in a name resolution query or name resolution response matches any one of domain name conditions held in the setting table, and a name resolution response/query transmission/reception unit which adds encrypted communication path setting information corresponding to the matched domain name condition to the name resolution response and transmits it.

The name resolution proxy unit F12a comprises the encrypted communication path setting unit F123a which, upon receiving the name resolution response with the encrypted communication path setting information from the name resolution server, registers, in the encrypted communication path setting table F142a, the correspondence between the encrypted communication path setting information, the IP address of the other node apparatus resolved by the name resolution response, and the intercept address that is not used in any other communication session, and the DNS query/response transmission/reception unit F121a which transmits, to the application as the name resolution response, an intercept address corresponding to the IP address of the other node apparatus contained in the name resolution response received from the name resolution server.

The effects of this embodiment will be described below. In this embodiment, communication partner type determination and communication encryption processing for an encrypted communication target node are done not in each client node but in an external communication encryption node. Hence, the system can be used even when no communication encryption module can be installed in the client node. In addition, the load on the client node is light as compared to a case wherein communication partner type determination and communication encryption processing for an encrypted communication target node are executed in the client node. Hence, the system can be used even in a node (e.g., a cellular phone and PDA) with a relatively low calculation capability.

The embodiments of the present invention have been described above. The present invention is not limited to the above-described embodiments, and various changes and modifications can be made. The functions of the client node apparatus, communication encryption node apparatus, and name resolution server of the present invention can be implemented by hardware or by a computer and program. The program is recorded on a computer-readable recording medium such as a magnetic disk and semiconductor memory and read out by a computer in activating it. The computer is caused to function as the client node apparatus, communication encryption node apparatus, and name resolution server of the above-described embodiments by controlling the operation of the computer.

The invention claimed is:

1. An encrypted communication method characterized by comprising the steps of:
    a) causing a communication method resolution unit to determine on the basis of a domain name contained in one of a name resolution query transmitted from an application that communicates with a node apparatus connected to a network to resolve an IP address of the node apparatus and a name resolution response as a response to the name resolution query whether the node apparatus is an encrypted communication target node;
    b) causing an encrypted communication path setting unit to register the IP address of the node apparatus in an encrypted communication path setting table when the node apparatus is the encrypted communication target node;
    c) causing a name resolution query/response transmission/reception unit to transmit the IP address of the node apparatus contained in the name resolution response to the application;
    d) causing the application to transmit a data packet in which the IP address of the node apparatus is set as a destination address; and
    e) causing a data transmission/reception unit to receive the data packet transmitted from the application and, if a communication partner IP address set as the destination address of the data packet is registered in the encrypted communication path setting table, encrypt and transmit the data packet.

2. An encrypted communication method according to claim 1, characterized in that processes of the step a, the step b, and the step c are executed by a name resolution proxy unit provided in a node apparatus in which the application operates.

3. An encrypted communication method according to claim 1, characterized in that a process of the step a is executed by a name resolution server, and processes of the step b and the step c are executed by a name resolution proxy unit provided in a node apparatus in which the application operates.

4. An encrypted communication method according to claim 1, characterized in that the communication method resolution unit determines whether the node apparatus is an encrypted communication target node by looking up a setting table in which at least part of the domain name of the encrypted communication target node is registered.

5. An encrypted communication method characterized by comprising the steps of:
    a) causing a communication method resolution unit to determine on the basis of a domain name contained in one of a name resolution query transmitted from an application on a client node to resolve an IP address of another node apparatus serving as a communication target of the application and a name resolution response as a response to the name resolution query whether said other node apparatus is an encrypted communication target node;
    b) causing an encrypted communication path setting unit to register, in an encrypted communication path setting table, a correspondence between the IP address of said other node apparatus and an intercept address that is not used in any other communication session when said other node apparatus is the encrypted communication target node;
    c) causing a name resolution query/response transmission/reception unit to transmit, to the application as the name resolution response, an intercept address corresponding to the IP address of said other node apparatus contained in the name resolution response;
    d) causing the application to transmit a data packet in which the intercept address is set as a destination address; and
    e) causing a data transmission/reception unit to receive the data packet transmitted from the application, read out, from the encrypted communication path setting table, a communication partner IP address corresponding to the intercept address set as the destination address of the data packet, set the readout communication partner IP address as the destination address of the data packet, and encrypt and transmit the set data packet.

6. An encrypted communication method according to claim 5, characterized in that processes of the step a, the step b, and the step c are executed by a name resolution proxy unit provided in a communication encryption node apparatus having the data transmission/reception unit.

7. An encrypted communication method according to claim 5, characterized in that a process of the step a is executed by a name resolution server, and processes of the step b and the step c are executed by a name resolution proxy unit provided in a communication encryption node apparatus having the data transmission/reception unit.

8. An encrypted communication method according to claim 5, characterized in that the communication method resolution unit determines whether said other node apparatus is an encrypted communication target node by looking up a setting table in which at least part of the domain name of the encrypted communication target node is registered.

9. A node apparatus characterized by comprising:
    an application that communicates with another node apparatus connected to a network;
    a data transmission/reception unit provided in a kernel unit; and
    a name resolution proxy unit which relays a name resolution query transmitted from said application to a name resolution server to resolve an IP address of said other node apparatus and a name resolution response as a response to the name resolution query,
    said data transmission/reception unit comprising
        an encrypted communication path setting table which holds a communication partner IP address, and
        a communication encryption unit which receives a data packet transmitted from said application and encrypts and transmits the data packet when a communication partner IP address set as the destination address of the data packet is registered in said encrypted communication path setting table, and said name resolution proxy unit comprising an encrypted communication path setting unit which registers, in said encrypted communication path setting table, the IP address of said other node apparatus resolved by the name resolution response if it is determined on the basis of a domain name of said other node apparatus contained in one of the name resolution query and the name resolution response that said other node apparatus is an encrypted communication target node.

10. A node apparatus according to claim 9, characterized in that said encrypted communication path setting table holds a plurality of communication partner IP addresses.

11. A node apparatus according to claim 9, characterized in that said name resolution proxy unit further comprises a communication method resolution unit which determines on the basis of the domain name of said other node apparatus whether said other node apparatus is the encrypted communication target node.

12. A node apparatus according to claim 11, characterized in that said encrypted communication path setting table holds encrypted communication path setting information to be used for communication with a communication partner in correspondence with the communication partner IP address, said communication encryption unit reads out corresponding encrypted communication path setting information from said encrypted communication path setting table, encrypts the data packet in accordance with the readout encrypted communication path setting information, and transmits the data packet when the communication partner IP address set as the destination address of the received data packet is registered in said encrypted communication path setting table, said name resolution proxy unit further comprises a setting table which holds a correspondence between a domain name condition to specify an encrypted communication target node and encrypted communication path setting information, said communication method resolution unit determines that said other node apparatus is the encrypted communication target node when the domain name of said other node apparatus matches any one of domain name conditions held in said setting table, and said encrypted communication path setting unit registers, in said encrypted communication path setting table, encrypted communication path setting information corresponding to the matched domain name condition in correspondence with the IP address of said other node apparatus.

13. A node apparatus according to claim 11, characterized in that said communication method resolution unit determines whether said other node apparatus is an encrypted communication target node by looking up a setting table in which at least part of the domain name of the encrypted communication target node is registered.

14. A node apparatus according to claim 9, characterized in that said name resolution proxy unit further comprises a name resolution query/response transmission/reception unit which transmits, to the name resolution server, the name resolution query transmitted from said application to resolve the IP address of said other node apparatus, receives, from the name resolution server, the name resolution response containing a determination result indicating whether said other node apparatus is an encrypted communication target node and the IP address of said other node apparatus, and transmits, to said application, the name resolution response containing the IP address of said other node apparatus contained in the name resolution response.

15. A node apparatus according to claim 14, characterized in that said encrypted communication path setting table holds encrypted communication path setting information to be used for communication with a communication partner in correspondence with the communication partner IP address, said communication encryption unit reads out corresponding encrypted communication path setting information from said encrypted communication path setting table, encrypts the data packet in accordance with the readout encrypted communication path setting information, and transmits the data packet when the communication partner IP address set as the destination address of the received data packet is registered in said encrypted communication path setting table, said name resolution query/response transmission/reception unit receives, from the name resolution server, the name resolution response further containing encrypted communication path setting information in addition to the determination result and the IP address of said other node apparatus, and said encrypted communication path setting unit registers, in said encrypted communication path setting table, encrypted communication path setting information contained in the name resolution response in correspondence with the IP address of said other node apparatus.

16. A communication encryption node apparatus connected, through a network, to a client node apparatus in which an application that communicates with another node apparatus connected to the network operates, characterized by comprising:

a data transmission/reception unit provided in a kernel unit; and a name resolution proxy unit which relays a name resolution query transmitted from the application to a name resolution server to resolve an IP address of said other node apparatus and a name resolution response as a response to the name resolution query, said data transmission/reception unit comprising an encrypted communication path setting table which holds a correspondence between a communication partner IP address and an intercept address, and a communication encryption unit which receives a data packet transmitted from the application, reads out, from said encrypted communication path setting table, a communication partner IP address corresponding to an intercept address set as a destination address of the data packet, sets the readout communication partner IP address as the destination address of the data packet, and encrypts and transmits the set data packet, and said name resolution proxy unit comprising an encrypted communication path setting unit which registers, in said encrypted communication path setting table, a correspondence between the IP address of said other node apparatus resolved by the name resolution response and an intercept address that is not used in any other communication session if it is determined on the basis of a domain name of said other node apparatus contained in one of the name resolution query and the name resolution response that said other node apparatus is an encrypted communication target node, and a name resolution query/response transmission/reception unit which transmits, to the application as the name resolution response, the intercept address corresponding to the IP address of said other node apparatus contained in the name resolution response received from the name resolution server.

17. A communication encryption node apparatus according to claim 16, characterized in that said encrypted communication path setting table holds a plurality of correspondences between the communication partner IP address and the intercept address.

18. A communication encryption node apparatus according to claim 17, characterized in that said encrypted communication path setting table holds encrypted communication path setting information to be used for communication with a communication partner in correspondence with the communication partner IP address and the intercept address, said communication encryption unit reads out, from said encrypted communication path setting table, encrypted communication path setting information and the communication partner IP address corresponding to the intercept address set as the destination address of the received data packet, encrypts the data packet having the readout communication partner IP address set as the destination address in accordance with the readout encrypted communication path setting information, and transmits the data packet, said name resolution proxy unit further comprises a setting table which holds a correspondence between a domain name condition to specify an encrypted communication target node and encrypted communication path setting information, said communication method resolution unit determines that said other node apparatus is the encrypted communication target node when the domain name of said other node apparatus matches any one of domain name conditions held in said setting table, and said encrypted communication path setting unit registers, in said encrypted communication path setting table, encrypted communication path setting information corresponding to the matched domain name condition in correspondence with the IP address of said other node apparatus and the intercept address.

19. A communication encryption node apparatus according to claim 16, characterized in that said name resolution proxy unit further comprises a communication method resolution unit which determines on the basis of the domain name of said other node apparatus whether said other node apparatus is the encrypted communication target node.

20. A communication encryption node apparatus according to claim 19, characterized in that said communication method resolution unit determines whether said other node apparatus is an encrypted communication target node by looking up a setting table in which at least part of the domain name of the encrypted communication target node is registered.

21. A communication encryption node apparatus according to claim 16, characterized in that said name resolution query/response transmission/reception unit transmits, to the name resolution server, the name resolution query transmitted from the application to resolve the IP address of said other node apparatus, receives, from the name resolution server, the name resolution response containing a determination result indicating whether said other node apparatus is an encrypted communication target node and the IP address of said other node apparatus, and replaces the IP address of said other node apparatus contained in the name resolution response with the intercept address and transmits the name resolution response to the application if it is determined that said other node apparatus is the encrypted communication target node.

22. A communication encryption node apparatus according to claim 21, characterized in that said encrypted communication path setting table holds encrypted communication path setting information to be used for communication with a communication partner in correspondence with the communication partner IP address and the intercept address, said communication encryption unit reads out, from said encrypted communication path setting table, encrypted communication path setting information and the communication partner IP address corresponding to the intercept address set as the destination address of the received data packet, encrypts the data packet having the readout communication partner IP address set as the destination address in accordance with the readout encrypted communication path setting information, and transmits the data packet, said name resolution query/response transmission/reception unit receives, from the name resolution server, the name resolution response further containing encrypted communication path setting information in addition to the determination result and the IP address of said other node apparatus, and said encrypted communication path setting unit registers, in said encrypted communication path setting table, encrypted communication path setting information contained in the name resolution response in correspondence with the IP address of said other node apparatus and the intercept address.

23. An encrypted communication system characterized by comprising:

a node apparatus in which an application that communicates with another node apparatus connected to a network operates; and a name resolution server which resolves an IP address of each of said node apparatuses, said node apparatus comprising a data transmission/reception unit provided in a kernel unit, and a name resolution proxy unit which relays a name resolution query transmitted from the application to said name resolution server to resolve the IP address of said other node apparatus and a name resolution response as a response to the name resolution query, said data transmission/reception unit comprising an encrypted communication path setting table which holds a communication partner IP address, and a communication encryption unit which receives a data packet transmitted from the application and encrypts and transmits the data packet when a communication partner IP address set as the destination address of the data packet is registered in said encrypted communication path setting table, said name resolution server comprising a communication method resolution unit which determines on the basis of a domain name of said other node apparatus contained in one of the name resolution query and the name resolution response whether said other node apparatus is an encrypted communication target node, and said name resolution proxy unit comprising an encrypted communication path setting unit which registers, in said encrypted communication path setting table, the IP address of said other node apparatus resolved by the name resolution response if said other node apparatus is an encrypted communication target node.

24. An encrypted communication system according to claim 23, characterized in that said encrypted communication path setting table holds a plurality of communication partner IP addresses.

25. An encrypted communication system according to claim 23, characterized in that
said encrypted communication path setting table holds encrypted communication path setting information to be used for communication with a communication partner in correspondence with the communication partner IP address,
said communication encryption unit reads out corresponding encrypted communication path setting information from said encrypted communication path setting table, encrypts the data packet in accordance with the readout encrypted communication path setting information, and transmits the data packet when the communication partner IP address set as the destination address of the received data packet is registered in said encrypted communication path setting table,
said name resolution server comprises
a setting table which holds a correspondence between a domain name condition to specify an encrypted communication target node and encrypted communication path setting information,
means, serving as said communication method resolution unit, for determining whether the domain name of said other node apparatus matches any one of domain name conditions held in said setting table, and
a name resolution query/response transmission/reception unit which adds encrypted communication path setting information corresponding to the matched domain name condition to the name resolution response and transmits the name resolution response, and
said encrypted communication path setting unit registers the encrypted communication path setting information in said encrypted communication path setting table in correspondence with the IP address of said other node apparatus upon receiving the name resolution response added the encrypted communication path setting information from said name resolution server.

26. An encrypted communication system according to claim 23, characterized in that said communication method resolution unit determines whether said other node apparatus is an encrypted communication target node by looking up a setting table in which at least part of the domain name of the encrypted communication target node is registered.

27. An encrypted communication system characterized by comprising:
a client node apparatus in which an application that communicates with another node apparatus connected to a network operates;
a communication encryption node apparatus connected to said client node apparatus through the network; and
a name resolution server which resolves an IP address of each of said node apparatuses,
said communication encryption node apparatus comprising
a data transmission/reception unit provided in a kernel unit, and
a name resolution proxy unit which relays a name resolution query transmitted from the application to said name resolution server to resolve the IP address of said other node apparatus and a name resolution response as a response to the name resolution query,
said data transmission/reception unit comprising
an encrypted communication path setting table which holds a correspondence between a communication partner IP address and an intercept address, and
a communication encryption unit which receives a data packet transmitted from the application, reads out, from said encrypted communication path setting table, a communication partner IP address corresponding to an intercept address set as a destination address of the data packet, sets the readout communication partner IP address as the destination address of the data packet, and encrypts and transmits the set data packet,
said name resolution server comprising a communication method resolution unit which determines on the basis of a domain name of said other node apparatus contained in one of the name resolution query and the name resolution response whether said other node apparatus is an encrypted communication target node, and
said name resolution proxy unit comprising
an encrypted communication path setting unit which registers, in said encrypted communication path setting table, a correspondence between the IP address of said other node apparatus resolved by the name resolution response and an intercept address that is not used in any other communication session if said other node apparatus is an encrypted communication target node, and
a name resolution query/response transmission/reception unit which transmits, to the application as the name resolution response, the intercept address corresponding to the IP address of said other node apparatus contained in the name resolution response received from the name resolution server.

28. An encrypted communication system according to claim 27, characterized in that said encrypted communication path setting table holds a plurality of correspondences between the communication partner IP address and the intercept address.

29. An encrypted communication system according to claim 27, characterized in that
said encrypted communication path setting table holds encrypted communication path setting information to be used for communication with a communication partner in correspondence with the communication partner IP address and the intercept address,
said communication encryption unit reads out, from said encrypted communication path setting table, encrypted communication path setting information and the communication partner IP address corresponding to the intercept address set as the destination address of the received data packet, encrypts the data packet having the readout communication partner IP address set as the destination address in accordance with the readout encrypted communication path setting information, and transmits the data packet,
said name resolution server comprises
a setting table which holds a correspondence between a domain name condition to specify an encrypted communication target node and encrypted communication path setting information, means, serving as said communication method resolution unit, for determining whether the domain name of said other node apparatus matches any one of domain name conditions held in said setting table, and a name resolution query/response transmission/reception unit which adds encrypted communication path setting information corresponding to the matched domain name condition to the name resolution response and transmits the name resolution response, and said encrypted communication path setting unit registers the encrypted communication path setting information in said encrypted communication path setting table in correspondence with the IP address of said other node apparatus and the intercept address upon receiving the name resolution response added the encrypted communication path setting information from said name resolution server.

30. An encrypted communication system according to claim 27, characterized in that said communication method resolution unit determines whether said other node apparatus is an encrypted communication target node by looking up a setting table in which at least part of the domain name of the encrypted communication target node is registered.

31. A non-transitory computer-readable medium having stored thereon a program which enables a computer included in a node apparatus, the node apparatus having an application operates therein which communicates with another node apparatus connected to a network, to function as:

communication encryption means provided in a data transmission/reception unit of a kernel unit, and name resolution proxy means for relaying a name resolution query transmitted from the application to a name resolution server to resolve an IP address of said other node apparatus and a name resolution response as a response to the name resolution query, characterized in that:

the program enables said communication encryption means to receive a data packet transmitted from the application and encrypt and transmit the data packet when a communication partner IP address set as the destination address of the data packet is registered in an encrypted communication path setting table that holds a communication partner IP address, and the program enables an encrypted communication path setting means, of said name resolution proxy means, to register, in the encrypted communication path setting table, the IP address of said other node apparatus resolved by the name resolution response if it is determined on the basis of a domain name of said other node apparatus contained in one of the name resolution query and the name resolution response that said other node apparatus is an encrypted communication target node.

32. A non-transitory computer-readable medium according to claim 31, characterized in that the encrypted communication path setting table holds a plurality of communication partner IP addresses.

33. A non-transitory computer-readable medium according to claim 31, characterized in that the program further enables a communication method resolution means, of said name resolution proxy means, to determine, on the basis of the domain name of said other node apparatus, whether said other node apparatus is an encrypted communication target node.

34. A non-transitory computer-readable medium according to claim 33, characterized in that the encrypted communication path setting table holds encrypted communication path setting information to be used for communication with a communication partner in correspondence with the communication partner IP address, the program further enables said communication encryption means to read out corresponding encrypted communication path setting information from said encrypted communication path setting table, encrypt the data packet in accordance with the readout encrypted communication path setting information, and transmit the data packet when the communication partner IP address set as the destination address of the received data packet is registered in said encrypted communication path setting table, the program further enables said communication method resolution means to determine that said other node apparatus is an encrypted communication target node when the domain name of said other node apparatus matches any one of domain name conditions held in a setting table that holds a correspondence between a domain name condition to specify an encrypted communication target node and encrypted communication path setting information, and the program further enables said encrypted communication path setting means to register, in the encrypted communication path setting table, encrypted communication path setting information corresponding to the matched domain name condition in correspondence with the IP address of said other node apparatus.

35. A non-transitory computer-readable medium according to claim 33, characterized in that the program further enables said communication method resolution means to determine whether said other node apparatus is an encrypted communication target node by looking up a setting table in which at least part of the domain name of the encrypted communication target node is registered.

36. A non-transitory computer-readable medium according to claim 31, characterized in that the program further enables a name resolution query/response transmission/reception means, of said name resolution proxy means, to transmit, to the name resolution server, the name resolution query transmitted from the application to resolve the IP address of said other node apparatus, receive, from the name resolution server, the name resolution response containing a determination result indicating whether said other node apparatus is an encrypted communication target node and the IP address of said other node apparatus, and transmit, to the application, the name resolution response containing the IP address of said other node apparatus contained in the name resolution response.

37. A non-transitory computer-readable medium according to claim 36, characterized in that the encrypted communication path setting table holds encrypted communication path setting information to be used for communication with a communication partner in correspondence with the communication partner IP address, the program further enables said communication encryption means to read out corresponding encrypted communication path setting information from the encrypted communication path setting table, encrypt the data packet in accordance with the readout encrypted communication path setting information, and transmit the data packet when the communication partner IP address set as the destination address of the received data packet is registered in the encrypted communication path setting table, the program further enables said name resolution query/response transmission/reception means to receive, from the name resolution server, the name resolution response further containing encrypted communication path setting information in addition to the determination result and the IP address of said other node apparatus, and the program further enables said encrypted communication path setting means to register, in the encrypted communication path setting table, encrypted communication path setting information contained in the name resolution response in correspondence with the IP address of said other node apparatus.

38. A non-transitory computer-readable medium having stored thereon a program which enables a computer included in a communication encryption node apparatus connected, through a network, to a client node apparatus having an application that operates therein and communicates with another node apparatus connected to the network, to function as communication encryption means provided in a data transmission/reception unit of a kernel unit, and name resolution proxy means for relaying a name resolution query transmitted from the application to a name resolution server to resolve an IP address of said other node apparatus and a name resolution response as a response to the name resolution query, characterized in that the program further enables said communication encryption means to receive a data packet transmitted from the application, read out, from an encrypted communication path setting table that holds a correspondence between a communication partner IP address and an intercept address, a communication partner IP address corresponding to an intercept address set as a destination address of the data packet, set the readout communication partner IP address as the destination address of the data packet, and encrypt and transmit the set data packet, the program further enables an encrypted communication path setting means of said name resolution proxy means to register, in the encrypted communication path setting table, a correspondence between the IP address of said other node apparatus resolved by the name resolution response and an intercept address that is not used in any other communication session if it is determined on the basis of a domain name of said other node apparatus contained in one of the name resolution query and the name resolution response that said other node apparatus is an encrypted communication target node, and the program further enables a name resolution query/response transmission/reception means, of said name resolution proxy means, to transmit, to the application as the name resolution response, the intercept address corresponding to the IP address of said other node apparatus contained in the name resolution response received from the name resolution server.

39. A non-transitory computer-readable medium according to claim 38, characterized in that the encrypted communication path setting table holds a plurality of correspondences between the communication partner IP address and the intercept address.

40. A non-transitory computer readable medium according to claim 38, characterized in that the program further enables communication method resolution means of said name resolution proxy means, to determine on the basis of the domain name of said other node apparatus whether said other node apparatus is the encrypted communication target node.

41. A non-transitory computer-readable medium according to claim 40, characterized in that the encrypted communication path setting table holds encrypted communication path setting information to be used for communication with a communication partner in correspondence with the communication partner IP address and the intercept address, the program further enables said communication encryption means to read out, from the encrypted communication path setting table, encrypted communication path setting information and the communication partner IP address corresponding to the intercept address set as the destination address of the received data packet, encrypt the data packet having the readout communication partner IP address set as the destination address in accordance with the readout encrypted communication path setting information, and transmit the data packet, the program further enables said communication method resolution means to determine that said other node apparatus is an encrypted communication target node when the domain name of said other node apparatus matches any one of domain name conditions held in a setting table that holds a correspondence between a domain name condition to specify an encrypted communication target node and encrypted communication path setting information, and the program further enables said encrypted communication path setting means to register, in the encrypted communication path setting table, encrypted communication path setting information corresponding to the matched domain name condition in correspondence with the IP address of said other node apparatus and the intercept address.

42. A non-transitory computer-readable medium according to claim 40, characterized in that the program further enables said communication method resolution means to determine whether said other node apparatus is an encrypted communication target node by looking up a setting table in which at least part of the domain name of the encrypted communication target node is registered.

43. A non-transitory computer-readable medium according to claim 38, characterized in that the program further enables said name resolution query/response transmission/reception means to transmit, to the name resolution server, the name resolution query transmitted from the application to resolve the IP address of said other node apparatus, receive, from the name resolution server, the name resolution response containing a determination result indicating whether said other node apparatus is an encrypted communication target node and the IP address of said other node apparatus, and replace the IP address of said other node apparatus contained in the name resolution response with the intercept address and transmit the name resolution response to the application if it is determined that said other node apparatus is the encrypted communication target node.

44. A non-transitory computer-readable medium according to claim 43, characterized in that the encrypted communication path setting table holds encrypted communication path setting information to be used for communication with a communication partner in correspondence with the communication partner IP address and the intercept address, the program further enables said communication encryption means to read out, from the encrypted communication path setting table, encrypted communication path setting information and the communication partner IP address corresponding to the intercept address set as the destination address of the received data packet, encrypt the data packet having the readout communication partner IP address set as the destination address in accordance with the readout encrypted communication path setting information, and transmit the data packet, the program further enables said name resolution query/response transmission/reception means to receive, from the name resolution server, the name resolution response further containing encrypted communication path setting information in addition to the determination result and the IP address of said other node apparatus, and
the program further enables said encrypted communication path setting means to register, in the encrypted communication path setting table, encrypted communication path setting information contained in the name resolution response in correspondence with the IP address of said other node apparatus and the intercept address.

* * * * *